United States Patent
Rashid et al.

(10) Patent No.: US 10,970,097 B2
(45) Date of Patent: Apr. 6, 2021

(54) ADAPTIVE WEB-BASED ROBOTIC PROCESS AUTOMATION

(71) Applicant: SAP SE, Walldorf (DE)

(72) Inventors: Mohammad Saad Rashid, Delhi (IN); Warren Mark Fernandes, Mumbai (IN); Mithilesh Kumar Singh, Ara (IN); Sonam Saxena, Lucknow (IN); Sai Phani Sharath Chandra Danthalapelli, Warangal (IN)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 16/556,065

(22) Filed: Aug. 29, 2019

(65) Prior Publication Data

US 2020/0401431 A1    Dec. 24, 2020

(30) Foreign Application Priority Data

Jun. 19, 2019   (IN) .............................. 201911024257

(51) Int. Cl.
  *G06F 9/44*   (2018.01)
  *G06F 9/455*  (2018.01)
  *G06F 9/451*  (2018.01)
  *G06F 40/14*  (2020.01)

(52) U.S. Cl.
  CPC .......... *G06F 9/45512* (2013.01); *G06F 9/451* (2018.02); *G06F 40/14* (2020.01)

(58) Field of Classification Search
  CPC ....... G06F 9/45512; G06F 9/451; G06F 40/14
  USPC ....................................................... 717/115
  See application file for complete search history.

(56) References Cited

U.S. PATENT DOCUMENTS

| | | |
|---|---|---|
| 9,003,356 B2 | 4/2015 | Driesen et al. |
| 9,009,784 B2 | 4/2015 | Chen et al. |
| 9,555,544 B2 | 1/2017 | Bataller et al. |
| 9,946,637 B2 | 4/2018 | Zhang et al. |
| 9,965,139 B2 | 5/2018 | Nychis et al. |
| 10,354,225 B2* | 7/2019 | Sharma .................. G06F 9/451 |
| 2017/0228119 A1 | 8/2017 | Hosbettu et al. |
| 2017/0352041 A1 | 12/2017 | Ramamurthy et al. |

(Continued)

OTHER PUBLICATIONS

"Robotic process automation," *Wikipedia*, www.wikipedia.org, visited Mar. 6, 2019, 4 pages.

(Continued)

*Primary Examiner* — Chuck O Kendall
(74) *Attorney, Agent, or Firm* — Klarquist Sparkman, LLP

(57) ABSTRACT

A computer-implemented method can receive a request from a robotic process automation engine to identify a target user interface control element in a webpage represented by a current master data frame. The current master data frame comprises a current document object model (DOM). The method can determine that a target user interface control element identifier associated with the target user interface control element is absent in the current DOM. The method can retrieve an archived version of the target user interface control element from an archived master data frame of the webpage. The method can find an equivalent user interface control element within the current master data frame based at least on the archived version of the target user interface control element, and output an equivalent user interface control element identifier associated with the equivalent user interface control element.

20 Claims, 20 Drawing Sheets

(56) References Cited

U.S. PATENT DOCUMENTS

2017/0372227 A1 12/2017 Hosabettu et al.
2018/0089344 A1 3/2018 Purohit
2018/0189170 A1 7/2018 Dwarakanath et al.
2018/0217722 A1 8/2018 Venkataraman et al.

OTHER PUBLICATIONS

"Document Object Model," *Wikipedia*, www.wikipedia.org, visited Mar. 13, 2019, 4 pages.
"Improve The Accessibility of Your Designs With ARIA," https://uxplanet.org/improve-the-accessibility-of-your-designs-with-aria-4595d8ea060f, visited Mar. 6, 2019, 12 pages.
"WAI-ARIA," https://en.wikipedia.org/wiki/WAI-ARIA, visited Mar. 6, 2019, 2 pages.
Hemphill, "What Automator can do for you," Macworld, Mar. 27, 2015, 5 pages.
Le Clair, "The Forrester Wave™: Robotic Process Automation, Q1 2017," Forrester, Feb. 13, 2017, 19 pages.
"Automation Anywhere Enterprise," Automation Anywhere, Inc., www.automationanywhere.com, visited Mar. 14, 2019, 18 pages.
"Example—Treeview," Open Ajax Alliance, oaa-accessibility.org, http://oaa-accessibility.org/examplep/treeview1/, visited May 5, 2019, 20 pages.

* cited by examiner

US 10,970,097 B2

ADAPTIVE WEB-BASED ROBOTIC PROCESS AUTOMATION

BACKGROUND

Robotic process automation (RPA) can use automation scripts, known as software robots, to automate and standardize repeatable business processes. RPA can mimic human activities by interacting with applications in the same way that a person does, thus having the potential to improve work productivity and reducing human error.

However, current RPA systems do not perform well with a web-based user interface (UI) because properties associated with a user interface control element in a webpage may change over time such that the user interface control element cannot be identified by the RPA systems.

Thus, there remains a need for an adaptive web-based RPA system that can automatically identify the missing control elements in a webpage regardless of the underlying user interface framework.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises, during robotic process automation (RPA) processing, receiving a request to identify a target user interface control element in a webpage represented by a current master data frame, wherein the current master data frame comprises a current document object model (DOM); determining that a target user interface control element identifier associated with the target user interface control element is absent in the current DOM; retrieving an archived version of the target user interface control element from an archived master data frame of the webpage; finding an equivalent user interface control element within the current master data frame based at least on the archived version of the target user interface control element; and outputting the equivalent user interface control element.

In another embodiment, a system comprises one or more processors; and memory coupled to the one or more processors comprising instructions causing the one or more processors to perform the following when executed: receiving a request from a robotic process automation (RPA) engine to identify a target user interface control element in a webpage represented by a current master data frame, wherein the current master data frame comprises a current document object model (DOM); determining that a target user interface control element identifier associated with the target user interface control element is absent in the current DOM; retrieving an archived version of the target user interface control element from an archived master data frame of the webpage; finding an equivalent user interface control element within the current master data frame based at least on the archived version of the target user interface control element; and outputting the equivalent user interface control element.

In another embodiment, one or more computer-readable media have encoded thereon computer-executable instructions causing one or more processors to perform a method comprising: while displaying a user interface comprising a plurality of user interface control elements represented by a current document object model (DOM), receiving a request from a robotic process automation (RPA) engine to identify a target user interface control element in a webpage represented by a current master data frame, wherein the current master data frame comprises a current document object model (DOM); determining that a target user interface control element identifier associated with the target user interface control element is absent in the current DOM; retrieving an archived version of the target user interface control element from an archived master data frame of the webpage; finding an equivalent user interface control element within the current master data frame based at least on the archived version of the target user interface control element; and outputting the equivalent user interface control element; wherein the archived version of the target user interface control element comprises a plurality of first attributes, and a candidate user interface control element in the current master data frame comprises a plurality of second attributes; wherein finding the equivalent user interface control element comprises identifying matching pairs between the plurality of first attributes of the archived version of the target user interface control element and the plurality of second attributes of the candidate user interface control element; wherein the plurality of first attributes comprise one or more first Accessible Rich Internet Application (ARIA) markers and the plurality of second attributes comprise one or more second ARIA markers, and wherein the one or more first ARIA markers and the one or more second ARIA markers are generated from an in-browser service; and wherein finding the equivalent user interface control element comprises identifying at least one of the first ARIA markers matches at least one of the second ARIA markers.

The foregoing and other objects, features, and advantages will become more apparent from the following detailed description, which proceeds with reference to the accompanying figures.

DETAILED DESCRIPTION

Example 1—Overview

Current RPA solutions do not perform well with web-based interfaces as they typically rely on the underlying document object model (DOM) properties to locate and interact with target control elements in a user interface (UI). Because the properties shown in the DOM for a webpage can be altered even when only non-functional changes are made to the webpage, the target control elements in a UI can be "lost" or "missing" for an RPA system. The RPA scripts can be broken when interacting with such a UI. The advancement of cloud computing poses further challenges of maintaining the RPA scripts when the properties associated with the target control elements have been changed, especially for some legacy applications that do not have public application programming interfaces (APIs). Without APIs, the RPA may be forced to rely on the UI itself as represented by the DOM.

The described technologies herein can automatically identify the missing target UI control elements in a webpage despite the change of properties associated with the target UI control elements, thus offering considerable improvements over conventional RPA techniques.

Example 2—Example Overall System Implementing an Adaptive Web-Based RPA System

Figure 1:
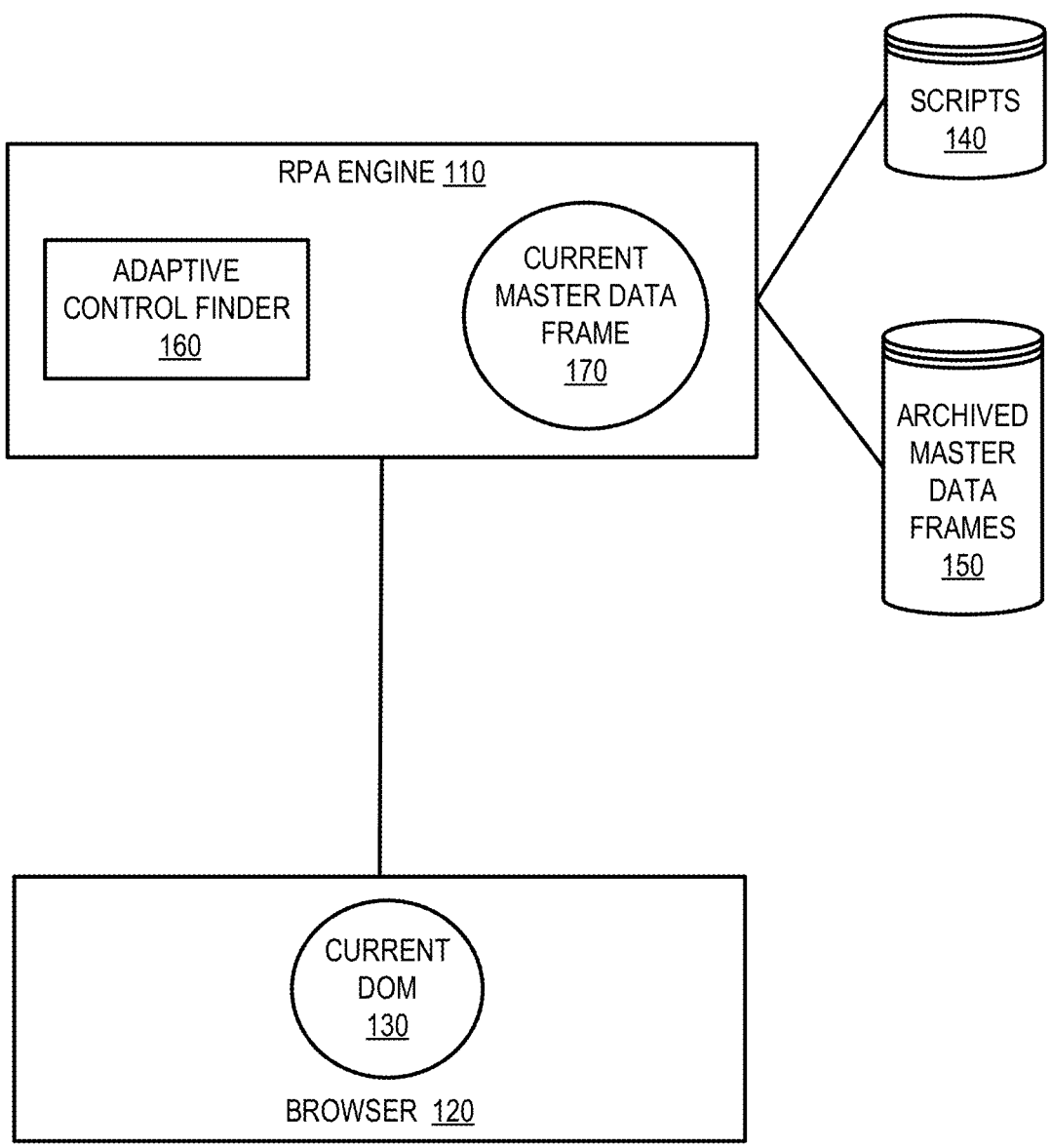
FIG. 1 is a block diagram of an example adaptive web-based RPA system.

FIG. 1 is a block diagram of an example overall system 100 implementing an adaptive web-based RPA system. In the example, the system 100 can include an RPA engine 110 and a web browser 120. For each currently displaying webpage, the web browser 120 can generate a current DOM 130 that represents the UI of the webpage. Thus, the system 100 is "web-based" in that it includes a DOM 130 that typically represents a webpage; however, the technologies could also be applied to other implementations. When activated, the RPA engine 110 can run the RPA scripts 140 to automatically identify and interact with a plurality of UI control elements in the currently displaying webpage. In practice, a script can instruct the RPA engine 110 to interact with and monitor the user interface (e.g., enter values, activate graphical buttons, read fields, and the like). As described herein, a script can refer to user interface elements via an identifier.

The RPA engine 110 can iterate over the lines in a script to execute the script from beginning to end. The engine 110 can support a syntax that allows for flow control (e.g., conditional branching and the like). A first statement in the script is executed according to the syntax, and the engine 110 fetches and executes the next script statement in a similar manner. The RPA engine 110 thus usefully automates interaction with the user interface to accomplish some supported task (e.g., performing database operations such as adding a user to a database, performing administrative functions such as approving a leave request, performing information services functions such as running a backup, or the like).

The RPA engine 110 can also interact with a database 150 containing archived master data frames. The RPA engine 110 can include an adaptive control finder 160, which can select a search method to find the missing target UI control element, as described more fully below. The RPA engine 110 can also include a current master data frame 170, which can incorporate the current DOM 130 of the webpage. The current master data frame 170 can be saved into, as well modified based on, the database 150 containing the archived master data frames.

As described herein, a master data frame can comprise properties from the DOM. Additional, supplemental properties (e.g., calculated by the browser or other services) can be included in the master data frame as well.

In practice, the systems shown herein, such as system 100, can vary in complexity, with additional functionality, more complex components, and the like. For example, there can be additional functionality within the RPA engine 110. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the instructions for implementing the RPA engine 110, the input, output and intermediate data of running the RPA engine 110 (e.g., the data pertaining to DOM, the properties of UI control elements as described below, etc.), and the like can be stored in one or more computer-readable storage media or computer-readable storage devices. The technologies described herein can be generic to the specifics of operating systems or hardware and can be applied in any variety of environments to take advantage of the described features.

Example 3—Example UI Control Elements and Associated Properties

In any of the examples herein, a webpage can include one or more UI control elements with which the RPA engine can interact. The UI control element can include, but are not limited to, any one of the following types: a list box, a dropdown list or menu, a table, a text box, a label, a form, a panel, a button, a checkbox, a combobox, a radio button, a push button, a toggle button, a hyperlink, a vertical or horizontal line separator, a vertical or horizontal slider, an icon, a date and time picker, etc.

Each of the UI control elements can have one or more associated properties (or attributes), each being defined by a pair of attribute name and value, e.g., {attribute name=value}. For example, a UI control element can be associated with a unique UI control element identifier (ID), e.g., {ID=id_numbed}. In another example, the UI control element can be associated with a type property characterizing the type of the UI control element, e.g., {Type=checkbox}. The UI control element can also have properties (e.g., type-specific or otherwise). For example, a UI control element pertaining to a button can include a property indicating text displayed on the button, e.g., {Button_Name=text}. In another example, a UI control element pertaining to a checkbox can include a property indicating the status of the checkbox, e.g., {CheckBox_Status=checked}. In still further examples, a UI control element can be associated with properties that define the location, size, color or other attributes of the UI control element.

In some embodiments, the properties associated with the UI control elements can be obtained from the DOM which can be stored as a tree structure and represent the logical structure of a current webpage.

In other embodiments, the properties associated with the UI control elements may not be available in the DOM. Instead, some of the properties associated with the UI control elements can be obtained from external services. For example, some of the properties associated the UI control elements can include Accessible Rich Internet Application (ARIA) properties, as described further below. Conventionally, ARIA properties are mainly used to improve the accessibility of a webpage to visually impaired users. For example, assistive technologies like screen readers can use ARIA properties to determine the functionality of the UI control elements, their current state, and any changing UI on the webpage. As described below, the RPA engine can be configured to reliably identify a missing target UI control element in a webpage by assessment of the ARIA properties.

Figure 2:
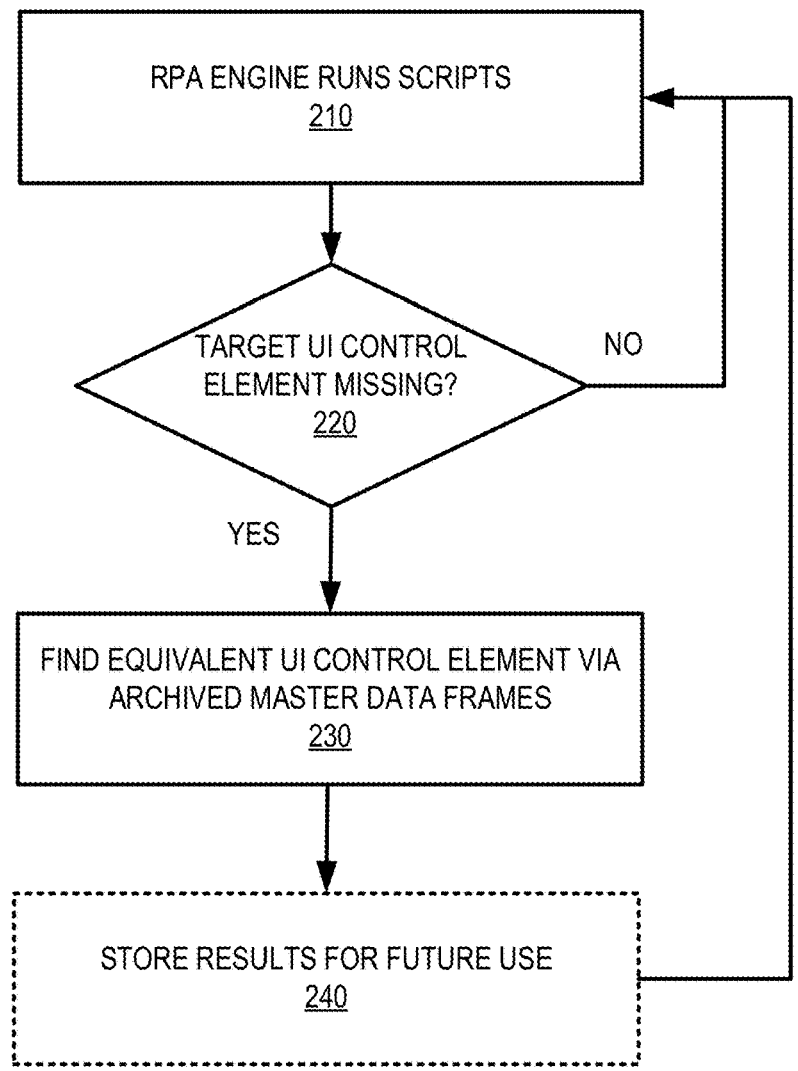
FIG. 2 is a flowchart illustrating an example overall operational process of an adaptive web-based RPA system.

Example 4—Example Overall Operational Method of an Adaptive Web-Based RPA System FIG. 2 is a flowchart depicting an example overall operational method 200 of an adaptive web-based RPA system. The method 200 can be performed, for example, by the system described in FIG. 1.

In this example, the RPA engine 110 can run the RPA scripts 140 at 210. The scripts 140 typically specify a number of steps that interact with the user interface and specify UI control elements via respective identifiers. For example, to activate a button, the script specifies an identifier of the button in a statement (e.g., "CLICK bt_OK1"). When the RPA engine 110 finds that a target UI control element is missing at 220, the RPA engine 110 can use a search method to find an equivalent UI control element via archived master data frames representing the target UI control element at 230.

Optionally, at 240, the results of the search method, including the found equivalent UI control element, can be saved in the database 150 for future use, for example, for quicker search of the target UI control element or assist in machine learning as described below. If the target UI control element is not missing or the RPA engine 110 finds the equivalent UI control element, the operation can return to 210 and continue running the RPA scripts 140.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5—Example Non-Functional Change of Webpage

A webpage can include a plurality of UI control elements that are represented in the DOM during webpage rendering. In practice, there may be interest in a particular one of the UI control elements. Such a UI control element of interest is called a "target UI control element." For example, during RPA processing, a script may contain a statement that activates a graphical pushbutton in the user interface.

However, properties associated with a target UI control element in a webpage can be changed over time (e.g., be modified by a programmer, development tool, migration tool, etc.), for example, during non-functional changes made to the webpage. As a result, an RPA engine that relies on such properties to identify the target UI control element in the webpage is not able to locate the target UI control element when executing the RPA scripts.

Figure 3:
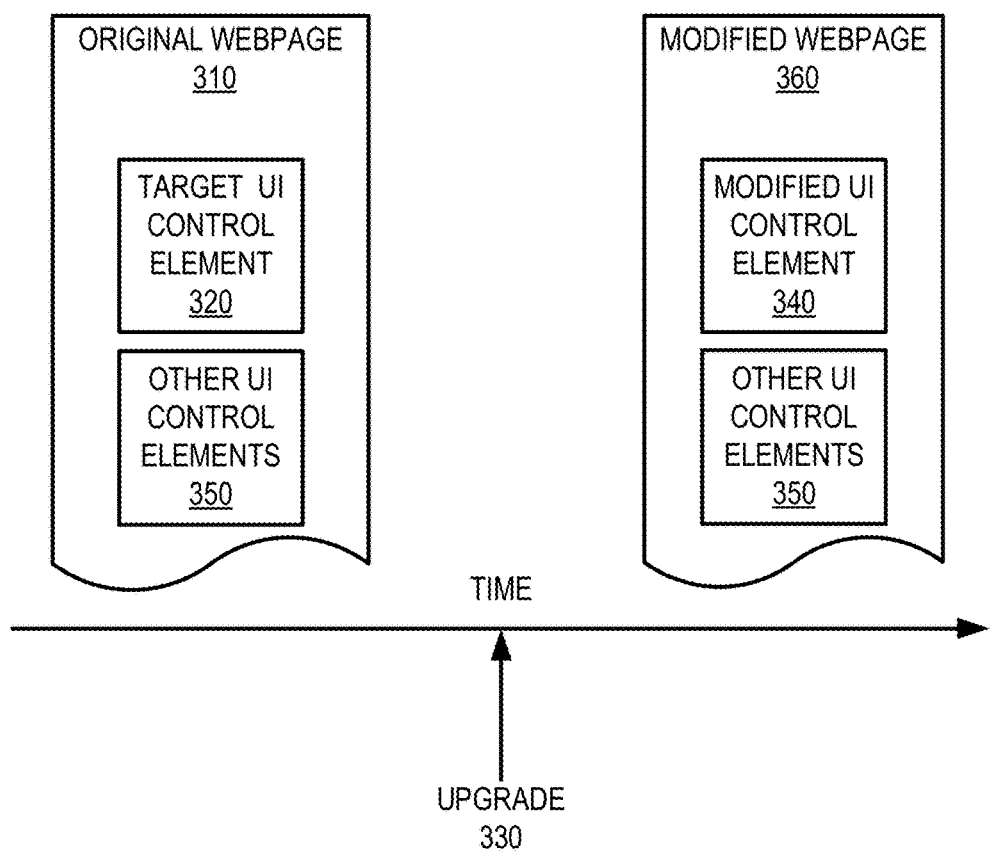
FIG. 3 is a diagram illustrating changes of a UI control element in a webpage.

As an example, FIG. 3 shows a schematic diagram 300 illustrating an original webpage 310 that received an upgrade 330 at a certain point of time and became a modified webpage 360. Such an upgrade may be performed by a programmer or an automated tool (e.g., during migration to a new framework or the like). The original webpage 310 includes a target UI control element 320 and other UI control elements 350. After the upgrade 330, while the other UI control elements 350 remain unchanged, the target UI control element 320 is changed to the modified UI control element 340, which is also termed "equivalent UI control element" as described herein.

In practice, the change to the webpage (e.g., the HTML representation) results in a change to the DOM that represents the webpage. If an RPA script was written to rely on an identifier of the UI control element, it may have changed, and thus not be found during script execution.

In any of the examples herein, the change from the target UI control element 320 to the equivalent UI control element 340 can be non-functional. Examples of non-functional changes include changes that do not affect the appearance of the UI control element, do not change the functionality (e.g., behavior) of the UI control element, or both. For example, if a non-functional change is made to a target control element, it can still function the same way (e.g., if it is a button, activating the button generates the same output as before; if it is a text box, the input will be processed in the same way as before). That is, from the perspective of an end user or an RPA engine that interacts with the UI, there is no functional difference by replacing the target UI control element with the equivalent UI control element.

One typical example is the change of a UI control element identifier. For example, the target UI control element 320 (e.g., a target button) may be associated with a target UI control element identifier $ID_1$, and the equivalent UI control element 340 (e.g., a modified button) may be associated with an equivalent UI control element identifier $ID_2$. The properties (e.g., all, most, or many of the properties) associated with the target UI control element 320 (e.g., the target button) and the equivalent UI control element 340 (e.g., the modified button) can be the same except for the change of the control identifier from $ID_1$ to $ID_2$. Thus, changing from the target UI control element 320 (e.g., the target button) to the equivalent UI control element 340 (e.g., the modified button) would not cause any functional change of the webpage (e.g., the way and results of interacting with the target button remain the same as the way and results of interacting with the modified button).

Changes to non-functional aspects of a UI control element can be made during programming, upgrading, or migration, without consideration of the impact on RPA systems. Such changes are ordinarily transparent to an end user and may not be visually manifested in the user interface, so they are believed to have no impact on the functionality of the software. However, the impact may be very disruptive to the RPA system, which relies on a DOM representation of the UI, which may in fact change.

While the change of UI control element identifier is described above as an example to illustrate the general concept of the non-functional change to a webpage, it should be understood that the same principles described herein can also be applied to non-functional change of other properties of the UI control elements, such as the label, size, position, text, font color or size of the control element, or the like. In some cases, a change in appearance (e.g., how the UI control element is rendered for display) may result without affecting behavior, which is still a non-functional change.

Example 6—Example Master Data Frames

Figure 4:
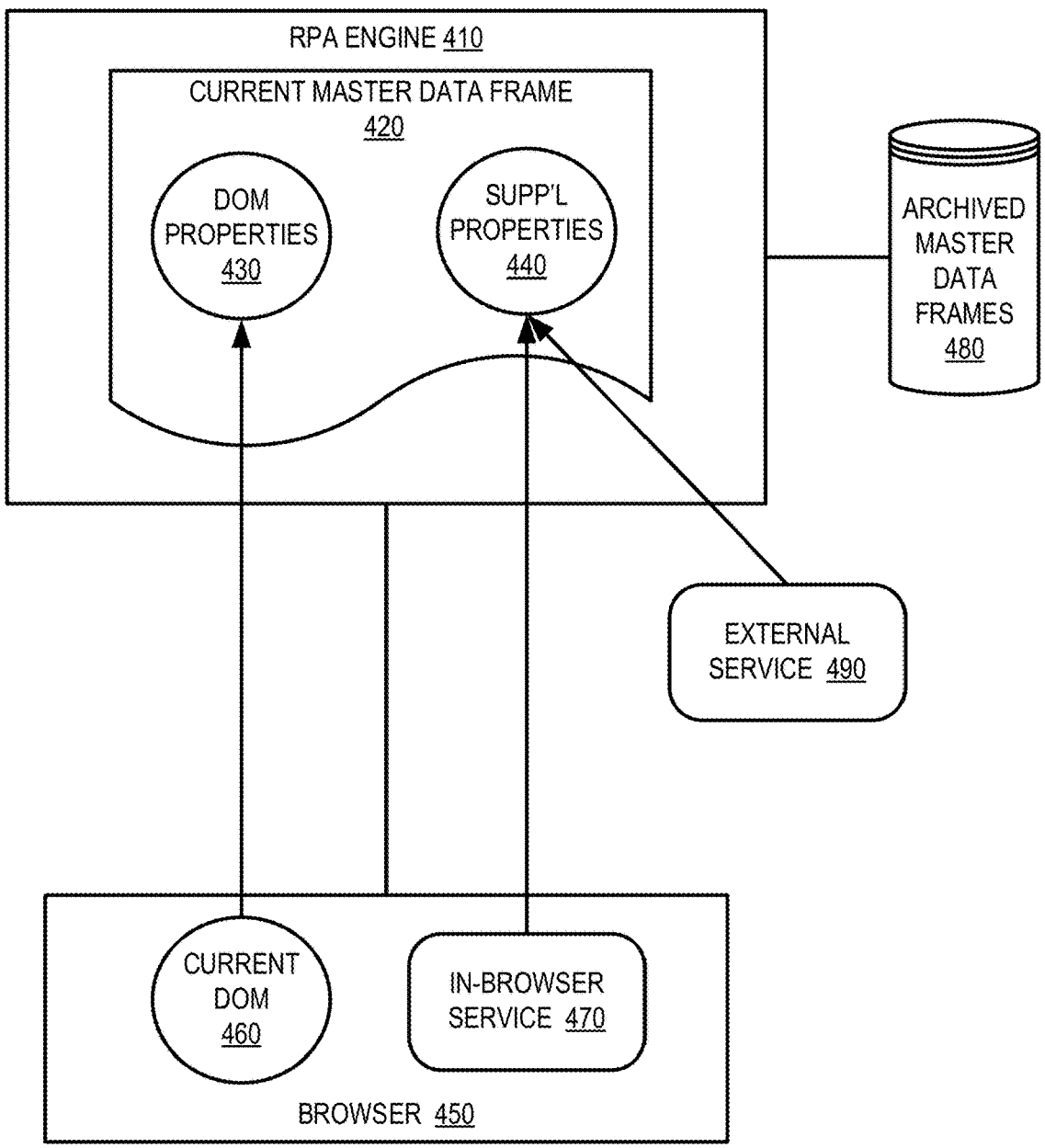
FIG. 4 is a block diagram illustrating the master data frame and its relationship with a web browser and other services.

FIG. 4 is a block diagram 400 illustrating a current master data frame 420 included in an RPA engine 410 and a web browser 450 (e.g., Google Chrome, Firefox of the Mozilla Foundation, Microsoft Internet Explorer, Microsoft Edge, Apple Safari, etc.). As described above, the RPA engine 410 can also interact with a database 480 containing archived master data frames.

The web browser 450 can generate a current DOM 460 as part of its usual task of rendering a web page. The web browser 450 can also include an in-browser service 470 configured to generate some supplemental properties 440 associated with the current webpage. In one non-limiting example, the in-browser service can provide ARIA information, and some of the supplemental properties 440 generated by the in-browser service 470 can include ARIA properties, as disclosed more fully below.

The current master data frame 420 can integrate DOM properties 430 of the current webpage and the supplemental properties 440 generated by the in-browser service 470. The DOM properties 430 can be retrieved from the current DOM 460. In some embodiments, the current DOM 460 can be fully integrated in the master data frame 420. In some embodiments, some of the supplemental properties 440 can be generated by external services 490 other than the in-browser service 470. For example, the external services 490 can include a visual scanning service and/or an optical character recognition service that generate image and/or text information of certain UI control elements displayed in the current webpage, and such image and/or text information can be included in the supplemental properties 440.

The DOM properties 430 and supplemental properties 440, if any, for a particular web page can be stored as an archived master data form in the archived master data frames 480. In practice, the archived master data frames 480 can be referenced by URL or some other identifier so that they can be retrieved at a later time for use to find absent UI control elements as disclosed herein.

Figure 5:
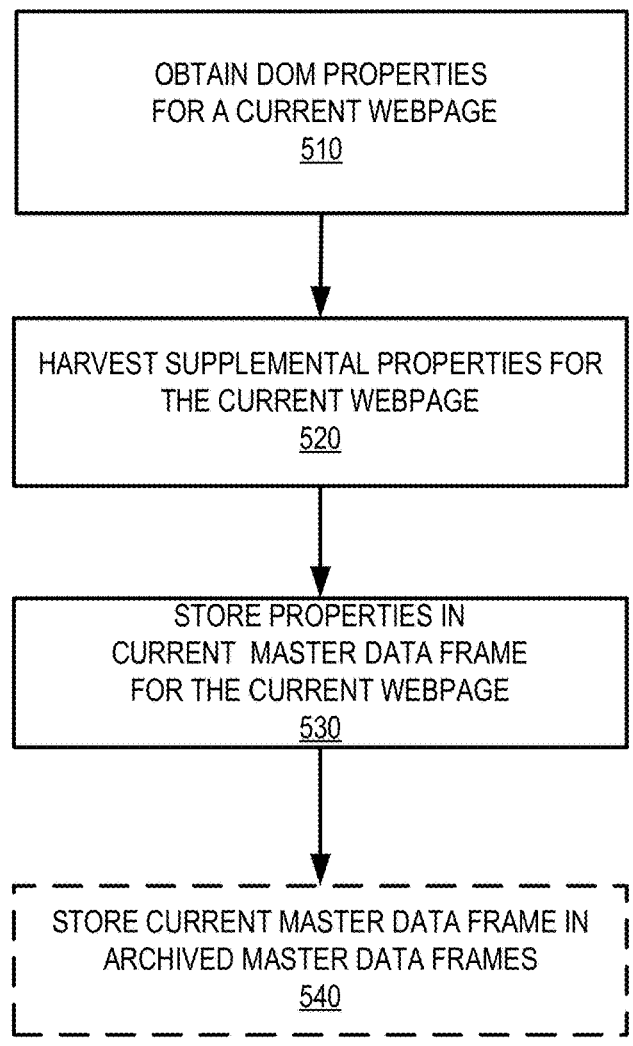
FIG. 5 is a flowchart of an example overall method of constructing a current master data frame.

FIG. 5 is a flowchart 500 of an example method of constructing a current master data frame and can be implemented, for example, by the system of FIG. 4. At 510, the method can retrieve the DOM properties for a current webpage (e.g., by requesting them from a DOM interface). At 520, the method can harvest supplemental properties for the webpage (e.g., from internal or external services). Then at 530, the method can combine the DOM properties and supplemental properties for the current webpage and save them into the current master data frame. The current master data frame can then be used for matching purposes (e.g., against archived master data frames that have been previously saved for the user interface).

In any of the examples herein, the constructed current master data frame can be stored in archived master data frames at 540 (e.g., for later matching purposes). Archiving can take place once or on a recurring basis. For example, as the webpage is updated from time to time through different versions, the archived master data frames can contain achieved versions of the DOM properties and supplemental properties corresponding to evolving versions of the webpage.

Thus, the master data frame described herein provides an internal data structure that maintains a unique identification profile for a UI control element in a webpage. Such unique identification profile can include not only direct properties obtained from the DOM (DOM properties), but also supplemental properties such as the ARIA properties that are extrinsic to the DOM structure. As an example, the following lists some properties of a unique identification "profile" corresponding to a "Save" button in a webpage:

```
Internal_id = fvkihs8y8syijsbjsbkj
/* Example direct properties obtained from DOM */
Type = clickable
Role = button
Label = Save
Id = UI5_98799
Class = ['class1' 'class2', . . . . ]
/* Example ARIA properties */
Aria_label = Save
Aria_role = button
/* Calculated Properties */
Name= Save button
Description= Save changed settings\
Value
Controls
```

Example 7—Example ARIA Tree and ARIA Properties

In any of the examples herein, the master data frame can contain supplemental properties such as ARIA properties. Example ARIA properties can include ARIA-Role, ARIA-Name, ARIA-Value, and ARIA-State. ARIA-Role can convey to users via accessible technology what type of object a UI control element is, such as a button or a table. ARIA-Name can provide a label for a UI control element, such as "Next" displayed on a button that moves users to the next page, or "Title" for an edit box. ARIA-Value can provide the value of the specified UI control element such as the value on a slider bar, or the information in an editable text box. ARIA-State can identify the current condition of the UI control element, such as checked for a checkbox. ARIA-State can advise whether a UI control element can be selected, focused, and/or other types of changeable functionality.

ARIA properties can come from different sources. In some embodiments, the ARIA properties can be generated by browsers by running some of the in-browser services, such as the Chrome Dev Tool protocol API for backend access or Screen Reader API for OS providers. Such in-browser services can compute ARIA properties from the existing UI control elements of the webpage. For example, an in-browser service can automatically generate an ARIA-Role of "button" for a button existing in a webpage, and set its ARIA-Name to the text appearing on the button. In other embodiments, the ARIA properties can be specified explicitly by a developer to improve the accessibility of the webpage. In still other embodiments, the ARIA properties can be dynamically generated by the browser, e.g., to provide ARIA-State of a UI control element at any given time point (e.g., "checked" for a checkbox or value for an edited textbox).

The ARIA properties can be computed and prioritized (e.g., multiple sources may be available for some properties) by the browser to build the final accessibility ARIA tree of a webpage. As described herein, the ARIA tree can be a hierarchical construct of UI control elements that includes accessible names and descriptions, plus supporting states and properties, which assistive technologies can interface with to enhance accessibility of the webpage. In other words, the ARIA tree can mirror the hierarchical HTML document alongside the accessibility information described above. Some browsers (PoC on Chrome) allow the pre-computed ARIA tree to be accessed directly via a built-in debugger protocol.

Unlike the DOM tree structure, which is dependent on a certain underlying UI representation that may rely on a particular UI framework, the ARIA tree correlates with the functional aspect of the webpage and is independent of any UI framework. That is, UI upgrades typically do not repurpose the ARIA properties or generate them robotically. Thus, even if a webpage upgrade changes some DOM properties of a UI control element (e.g., a change in UI control element identifier), the ARIA properties of the UI control element typically do not change so long as the UI control element still implement the same function.

For example, a clickable UI control element (e.g., a button, a link, etc.) can remain clickable, or a fillable UI control element (e.g., a textbox, or a text area, etc.) can remain fillable after a non-functional upgrade of the webpage. Accordingly, the ARIA properties can serve as functional identifiers of UI control elements of a webpage, so long as the UI control elements are functionally equivalent on how they are accessed (e.g., clickable for a button or a link, fillable for a textbox, etc.).

Incorporating the ARIA properties into the master data frame can facilitate efficient identification of a missing target UI control element. For example, a webpage upgrade may render a button to a link, or change a field to a dropdown list, or alter the appearance of a label, etc. Any of such mutations can modify the DOM properties of the corresponding UI control elements. As a result, a traditional RPA engine would fail to identify such UI control elements based on evaluation of the DOM properties. However, because the ARIA properties associated with such UI control elements remain unchanged, an ARIA-based RPA engine can reliably find those UI control elements based on their functional equivalence in terms of ARIA properties.

Example 8—Example Method of Harvesting ARIA Properties

Figure 6:
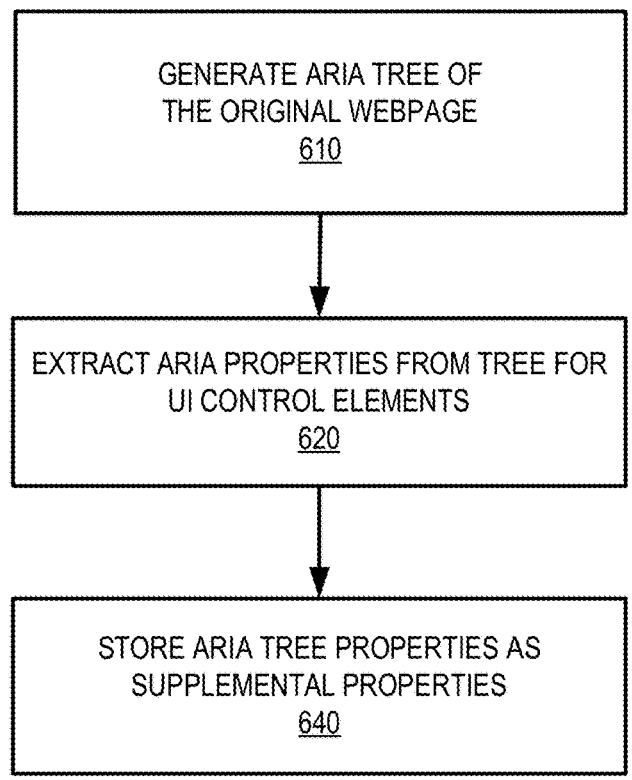
FIG. 6 is a flowchart of an example method of harvesting ARIA properties of a webpage.

FIG. 6 is a flowchart 600 of an example method of harvesting ARIA properties of a webpage and can be implemented, in any of the examples herein. At 610, the method generates the ARIA tree of the original webpage. Such ARIA tree of the original webpage can be generated by an in-browser service as part of the rendering process for a web page. A setting may need to be configured to activate ARIA processing. The ARIA properties (sometimes called "markers") can be used to advantage during matching as described herein.

At 620, the ARIA properties can be extracted from the ARIA tree for UI control elements. In some cases, the web page may need to be re-rendered. For example, if the ARIA tree only holds information of the UI control elements that are currently visible on the webpage, re-rendering of ARIA tree can account for major dynamic change of the webpage, e.g., the closing of a popup window, which can lead to a situation in which the mapping between the DOM properties and their equivalents in the master data frame are out of synchronization. Re-rendering simply re-builds the ARIA tree, for example, by querying the Chrome Dev Tools API recursively, extracting all the required ARIA properties. The ARIA tree can replace the existing mapping in the master data frame for subsequent use. This re-rendering process can be manually triggered but can be done automatically upon detection of loss of synchronization between the ARIA tree and the displayed UI.

At 640, the ARIA properties associated with the UI control elements are stored in the master data frame (e.g., in the archived master data frames). For example, the UI control elements in the webpage are located, and their properties (e.g., including the ARIA properties) can be archived for later use as disclosed herein.

Figure 7:
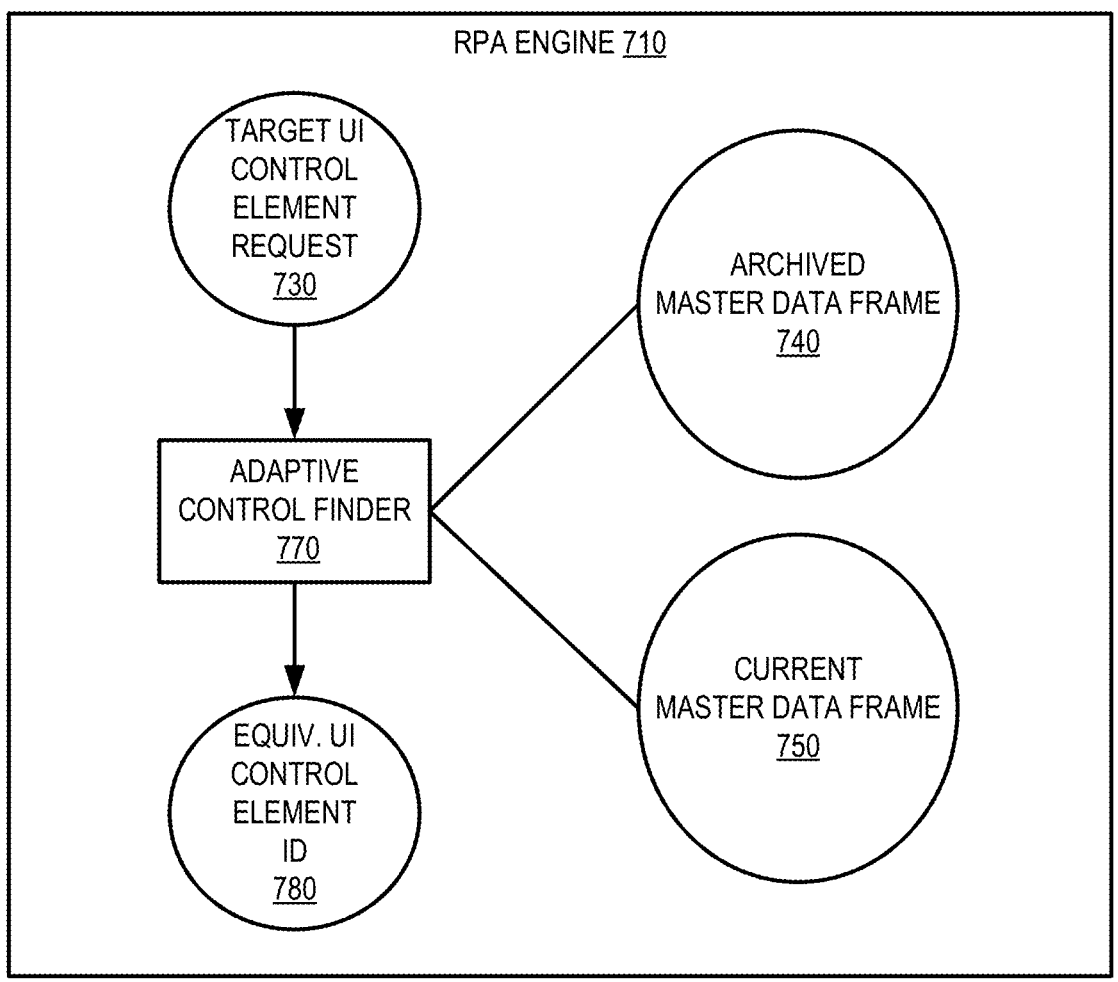
FIG. 7 is a block diagram of an example RPA engine that includes an adaptive control finder.

Example 9—Example Overview of the Operation the RPA Engine and Overall Method of Finding an Equivalent UI Control Element FIG. 7 shows a block diagram 700 of an example RPA engine 710 that includes an adaptive control finder 770. In the depicted embodiment, the RPA engine 710 can include an adaptive control finder 770. In alternative embodiments, the adaptive control finder 770 can be external to the RPA engine 710 (e.g., provided as a service to the RPA engine 710). The adaptive control finder 770 can receive a request at 730 to find a target UI control element which is associated with a target UI control element identifier. The adaptive control finder 770 can search for the target UI control element identifier in a current master data frame 750. If not found, the adaptive control finder 770 can further search for an equivalent UI control element in archived master data frames 740. If the equivalent UI control element is found, the adaptive control finder 770 can then output the equivalent UI control element identifier at 780.

Figure 8:
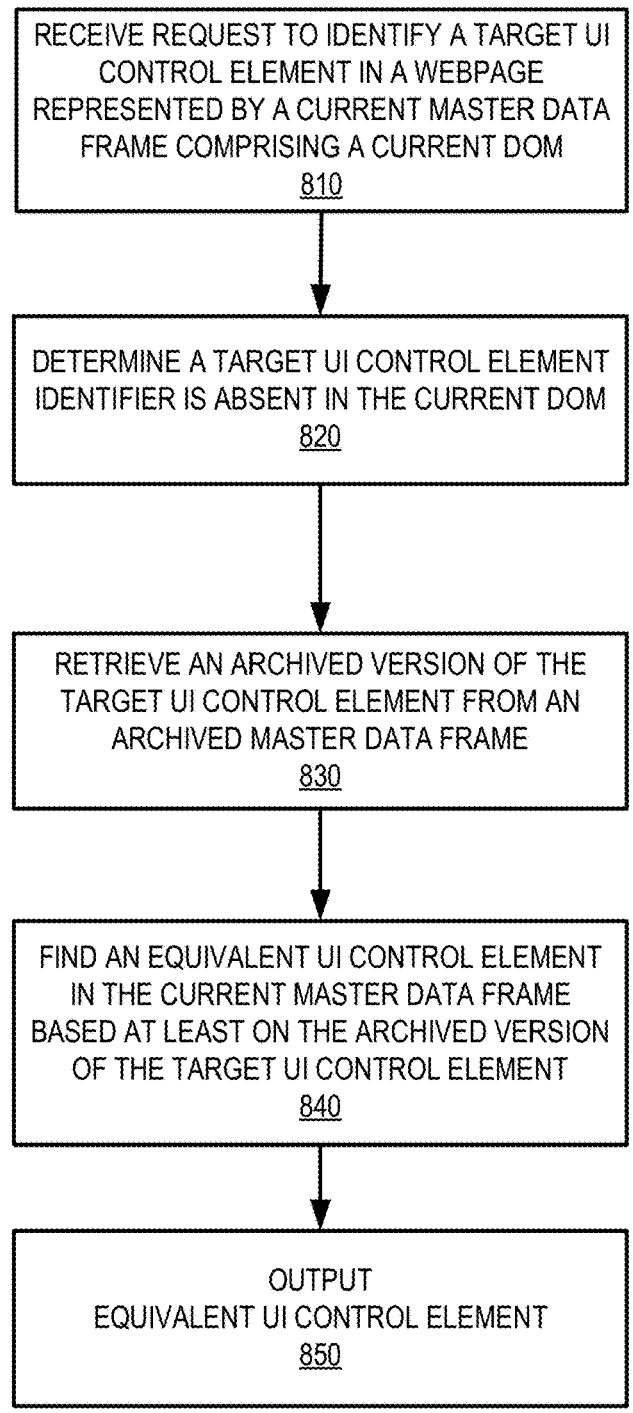
FIG. 8 is a flowchart of an example method of handling a missing target UI control element by an example RPA engine.

FIG. 8 is a flowchart of an example method 800 of handling a missing target UI control element and can be implemented, for example, by a system such as that shown in FIG. 7.

At 810, during robotic process automation (RPA) processing (e.g., execution of an RPA script that interacts with the currently displayed user interface that is represented by a current DOM), the adaptive control finder can receive a request from the RPA engine to identify a target UI control element in a current webpage. The current webpage can be represented by a current master data frame, which can include a current DOM (or at least contain properties of the current DOM). As described herein, the request can include an identifier of the target UI control element.

At 820, the adaptive control finder can determine that a target UI control element identifier associated with the target UI control element is absent in the current DOM. In other words, the target UI control element is missing based on the search of the target UI control element identifier (e.g., the UI control element is absent or not found in the DOM).

At 830, the adaptive control finder can retrieve an archived version of the target UI control element from an archived master data frame. For example, an identifier (e.g. URL) of the web page can be used to retrieve a previously stored archived master data frame for the web page being rendered. The archived version of the target user interface control element can comprise supplemental properties as described herein.

Figure 9:
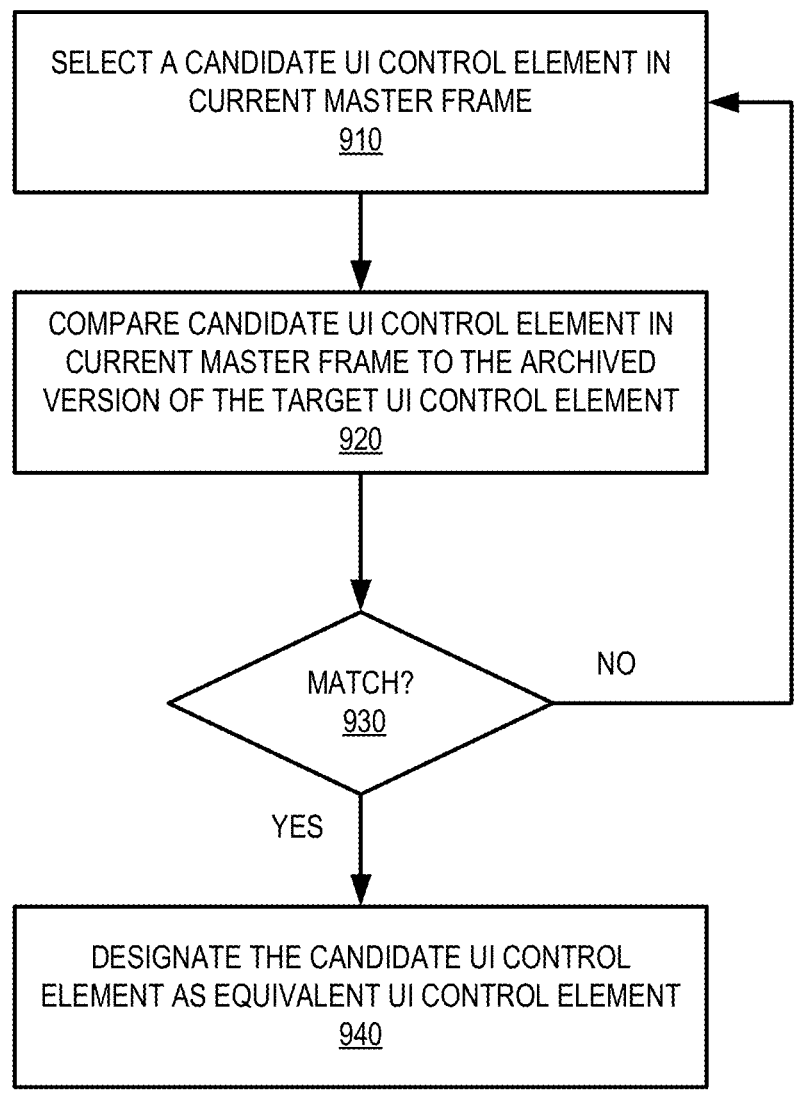
FIG. 9 is a flowchart of an example method of identifying an equivalent UI control element.

At 840, the adaptive control finder can find an equivalent UI control element in the current master data frame (e.g., in the current UI represented by the current DOM) based at least on the archived version of the target UI control element as described further in FIG. 9. As described herein, the equivalent user interface control element can be an element in the current web page that is functionally equivalent to the target user interface control element in the archived webpage.

At 850, the adaptive control finder can output the equivalent UI control element found at 840 (e.g., by returning an identifier associated with the equivalent UI control element that is in the current DOM). The identifier can then be used to find the UI control element and perform the instructed operation on the equivalent UI control element (in place of the missing one). In practice, the two UI elements are functionally equivalent as described herein.

FIG. 9 is a flowchart 900 of an example method of identifying an equivalent UI control element corresponding to a missing target UI control element and can be performed, for example, by a system such as that shown in FIG. 7.

At 910, the adaptive control finder can select a candidate UI control element in the current master data frame. Searching can start at a first (e.g., beginning element) and proceed from there. As described herein, searching can be informed by tree localization (e.g., searching starts within the master data frame at a location indicated by tree localization).

At 920, the adaptive control finder can compare the candidate UI control element in the current master data frame to an archived version of the target UI control element.

If the condition check 930 finds that the candidate UI control element matches the archived version of the target UI control element, then the candidate UI control element can be designated as the equivalent UI control element at 940.

If no match is found at 930, the adaptive control finder can return to 910 and select another candidate UI control element for comparison.

As described below, the determination of matching between the candidate UI control element and the archived version of the target UI control element can be based on multiple attributes, or some other criteria. In certain embodiments, a match can be determined immediately when a similarity score between the candidate UI control element and the archived version of the target UI control element is above a predefined threshold. In other embodiments, the adaptive control finder will not declare a match until it loops through the candidate UI control elements (e.g., all of them), and only then designates the candidate UI control element that is associated with the highest similarity score to be the equivalent UI control element.

Figure 10:
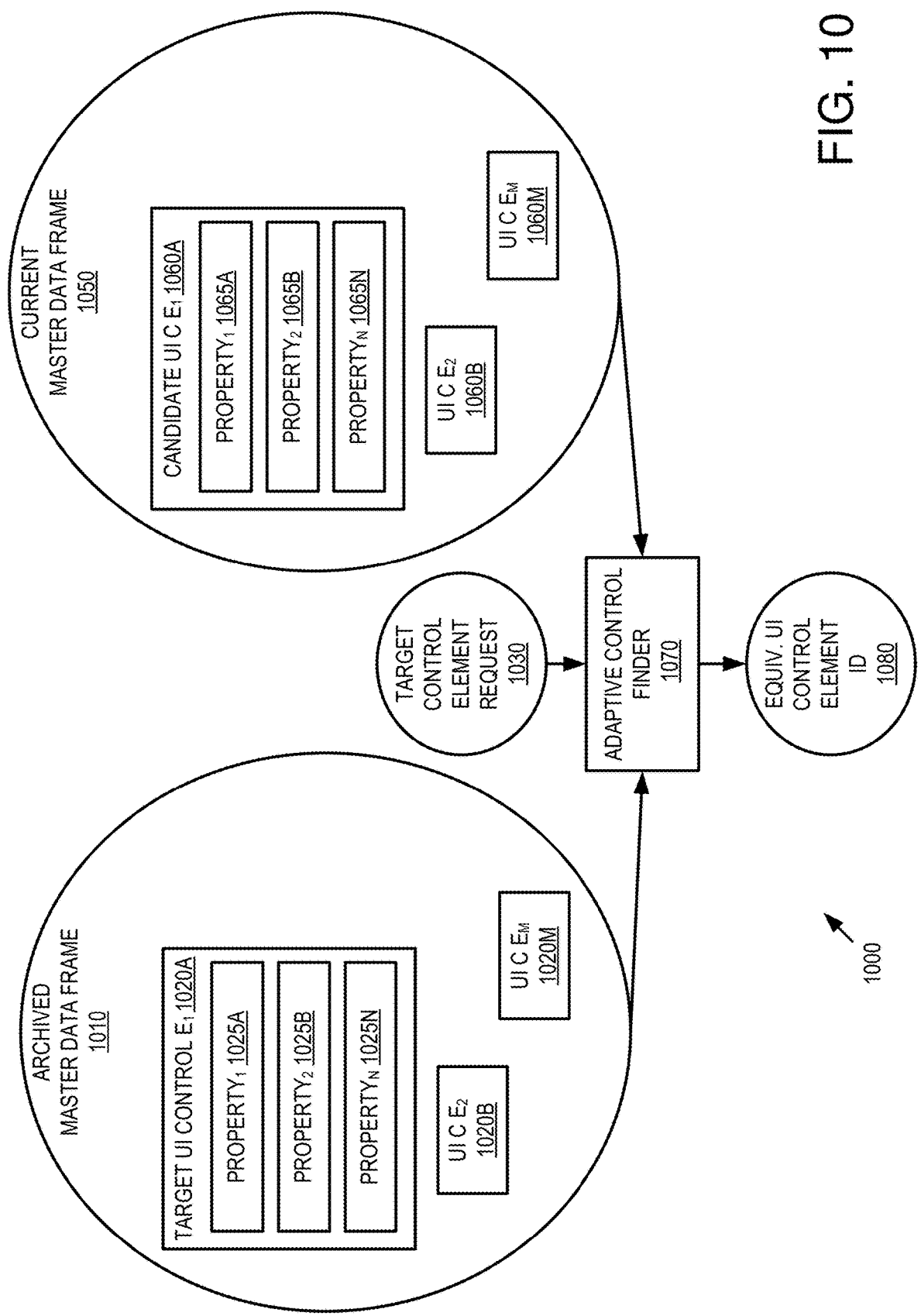
FIG. 10 is a block diagram illustrating an example comparison between an archived version of the UI control element and a candidate UI control element based on multiple attributes of UI control elements.

Example 10—Example Method of Finding Equivalent UI Control Element Based on Comparison of Multiple Properties FIG. 10 is a block diagram 1000 illustrating an example comparison between a candidate UI control element and an archived version of the UI control element based on multiple attributes of the UI control elements.

The diagram 1000 shows an archived master data frame 1010 that contains an archived version of the target UI control element 1020A and a plurality of other archived UI control elements such as 1020B and 1020M. The diagram 1000 also shows the current master data frame 1050 that contains a candidate UI control element 1060A and a plurality of other candidate UI control elements such as 1060B and 1060M. In practice, there may be a different number of elements in the two frames.

After the adaptive control finder 1070 receives a request to find the target control element at 1030, it can compare the candidate UI control element 1060A and the archived version of the target UI control element 1020A to determine if they match. Comparison can also be made against other elements in the current master data frame 1050. The matched candidate UI control element can be designated as the equivalent UI control element and its identifier can be outputted at 1080.

Figure 11:
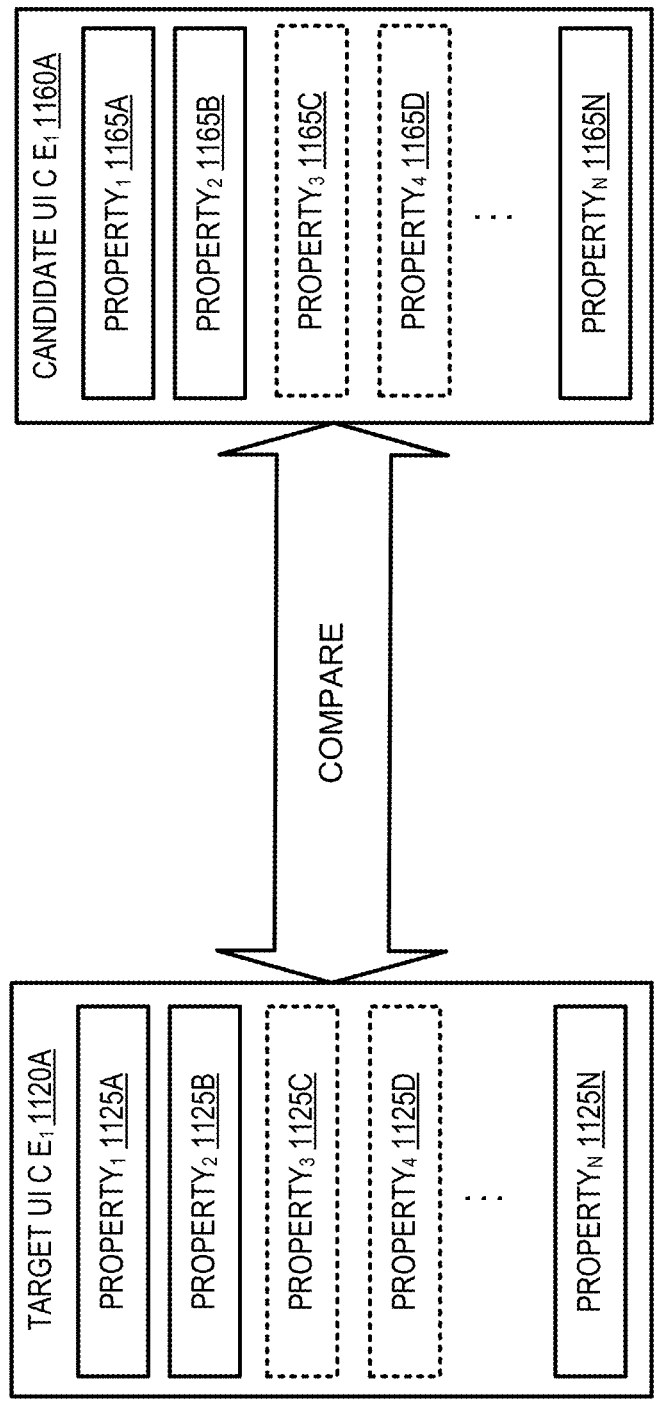
FIG. 11 is a diagram illustrating an example comparison of multiple attributes between a target UI control element and a candidate UI control element.

FIG. 11 is a schematic diagram 1100 illustrating an example comparison between a target UI control element and a candidate UI control element based on multiple properties (or attributes) of the UI control elements. In the example, the target UI control element 1120A includes a plurality of properties 1125A-N and the candidate UI control element 1160A includes a plurality of properties 1165A-N. As noted above, each property can be represented by an (attribute name, attribute value) pair. A property of 1160A and a property of 1120A are deemed to be a matching pair if both properties share the same attribute name and value. The candidate UI control element 1160A can be deemed to match the target UI control element 1120A if one or more properties 1165A-N match the corresponding one or more properties 1125A-N. As described herein, supplemental properties can be included in the comparison.

Figure 12:
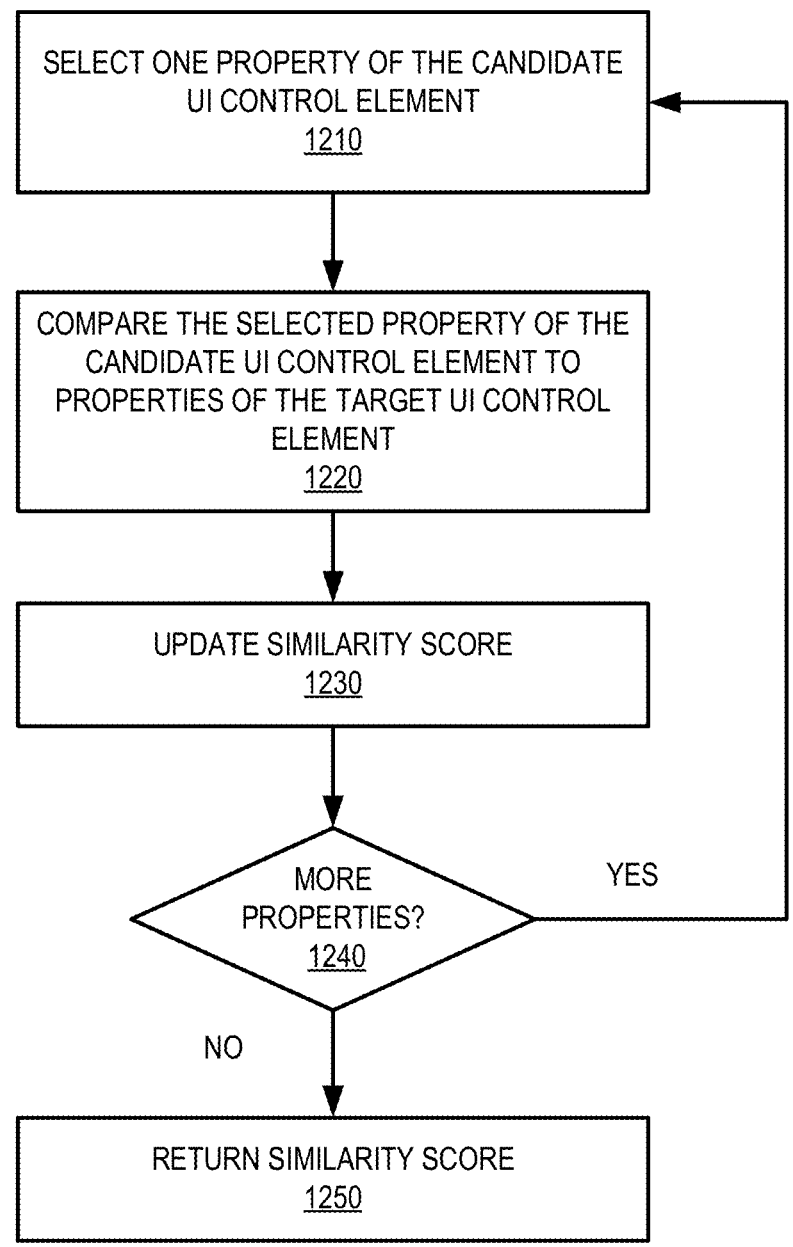
FIG. 12 is a flowchart illustrating an example method of calculating similarity score between a target UI control element and a candidate UI control element.

Example 11—Example Method of Calculating Similarity Score Based on Matching of Properties FIG. 12 a flowchart illustrating an example method 1200 of calculating a similarity score between a target UI control element and a candidate UI control element and can be implemented, for example, by a system such as that shown in FIG. 7. At 1210, the method selects one property of the candidate UI control element. The method then compares the selected property of the candidate UI control element with properties of the target UI control element at 1220 to determine if there is a matching pair.

Depending on whether there is a matching pair, the method can update a similarity score at 1230. Weighting can be used by which some properties are given more weight than others as disclosed herein.

At 1240, the method checks if further properties are to be compared. If so, the method can return to 1210 to select another property of the candidate UI control element for comparison. Otherwise, the method can return the similarity score at 1250.

The method 1200 does not need to evaluate all properties of the candidate UI control element. For example, 1240 may stop the comparison if the similarity score has exceeded a predefined threshold, and if so, the method can return such above-threshold similarity score.

In certain embodiments, a few or even a single matching pair of properties (e.g., a matching pair of ARIA properties) between the candidate UI control element and the target UI control element can result in a similarity score that exceeds the predefined threshold, thus terminating the iteration. A match can thus be conclusively determined.

Figure 13:
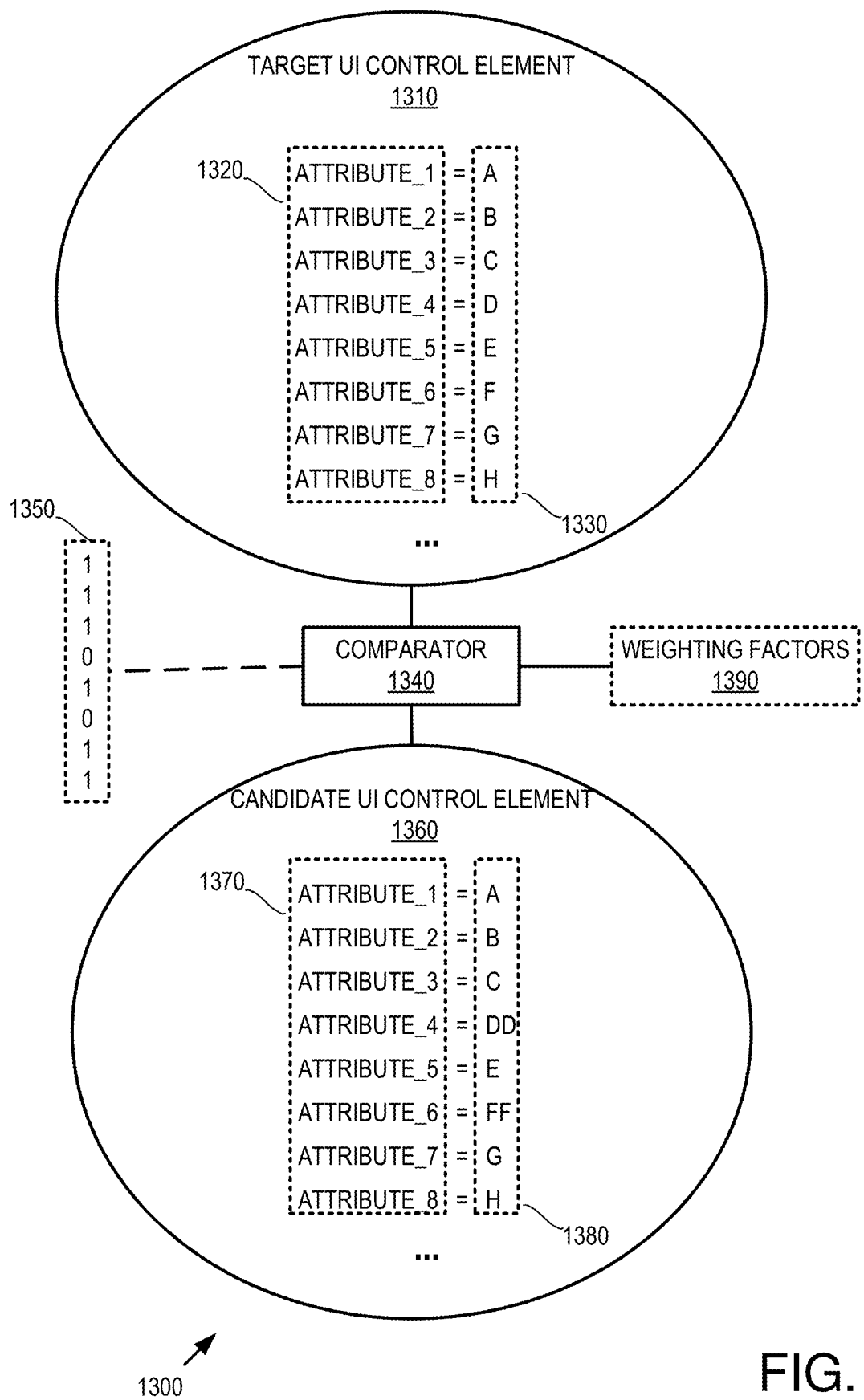
FIG. 13 is a diagram illustrating an example system identifying matching pairs of properties between a target UI control element and a candidate UI control element.

FIG. 13 is a diagram 1300 illustrating an example system identifying matching pairs of properties between a target UI control element and a candidate UI control element. In the example, the target UI control element 1310 contains eight properties having eight pairs of attribute names 1320 and values 1330. Similarly, the candidate UI control element 1360 contains eight properties having eight pairs of attribute names 1370 and values 1380. The properties (e.g., each property) of the candidate UI control element 1360 can be compared to the properties of the target UI control element by a comparator 1340. An example comparison result can be illustrated in 1350, where it is shown that out of the eight pairs of properties, six pairs are matching pairs (represented by 1) and two pairs are not matching pairs (represented by 0).

In one embodiment, the similarity score between the candidate UI control element 1360 and the target UI control element 1310 can be calculated based on the counting of matching pairs of properties. For example, in the example depicted in FIG. 13, a total of 6 matching pairs are found out of a total of 8 pairs of compared properties. Accordingly, the similarity score can be calculated as the 6 (i.e., the count of matching pairs) or 6/8 (i.e., the proportion of matching pairs). The candidate UI control element 1360 can be designated as an equivalent UI control element to the target UI control element 1310 if the similarity score is above a predefined threshold which can be an absolute number (e.g., 5) or a fraction (e.g., 5/8).

In another embodiment, the comparison results 1350 can be weighted by a set of weighting factors 1390, which can be predefined. Some of the properties may be more representative and/or stable with respect to the target UI control element. Accordingly, such properties can be associated with larger weighting factors compared to other properties. For example, if it is determined that the type and label properties are more stable than the ID or position/size properties of a target UI control element, then the weighting factors associated with the type and label properties can be set to be greater than or equal to 2, whereas those associated with the ID or position/size properties can be set to be less than or equal to 1. Thus, the candidate UI control element 1360 can be designated as the equivalent UI control element to the target UI control element 1310 if the weighted similarity score is above a predefined threshold.

In certain embodiments, some of the weighting factors can be automatically adjusted. For example, a weighting factor corresponding to a matching pair can be incremented when the candidate UI control element is identified as the equivalent UI control element. In another example, a weighting factor corresponding to a matching pair can be decremented or unchanged when the candidate UI control element is not identified as the equivalent UI control element. Thus, as the number of upgrades to the webpage increases, the adaptive control finder can learn from its past experience by automatically adjusting the weighting factors, e.g., giving more weight to stable properties that do not change over time compared to volatile properties that tend to change after upgrade of the webpage.

Figure 14:
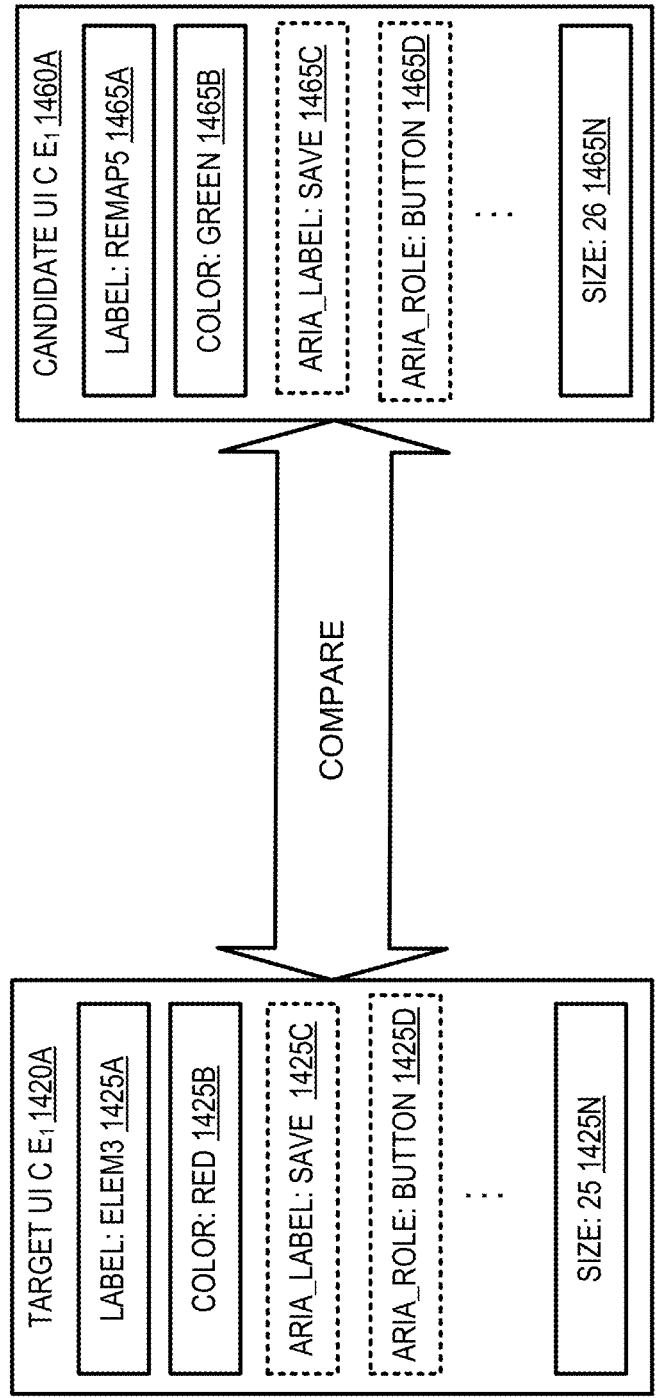
FIG. 14 is a diagram illustrating an example comparison of multiple attributes including ARIA properties between a target UI control element and a candidate UI control element.

Example 12—Example Method of Finding Equivalent UI Control Element Based on Matching of ARIA Properties FIG. 14 is a schematic diagram 1400 illustrating an example actual comparison of multiple attributes including ARIA properties between a target UI control element and a candidate UI control element.

In the example, the target UI control element 1420A has a plurality of properties including a label property 1425A (with attribute name LABEL and value ELEM3), a color property 1425B (with attribute name COLOR and value RED), a size property 1425N (with attribute name SIZE and value 25), as well as two supplemental properties: an ARIA label 1425C (with attribute name ARIA_LABEL and value SAVE) and an ARIA role 1425D (with attribute name ARIA_ROLE and value BUTTON). The candidate UI control element 1460A includes a label property 1465A (with attribute name LABEL and value REMAP5), a color property 1465B (with attribute name COLOR and value GREEN), a size property 1465N (with attribute name SIZE and value 26), as well as two supplemental properties: an ARIA label 1425C (with attribute name ARIA_LABEL and value SAVE) and an ARIA role 1425D (with attribute name ARIA_ROLE and value BUTTON).

By comparison, the target UI control element 1420A differs from the candidate UI control element 1460A in both the label property (e.g., ELEM3 vs. REMAP5) and the color property (e.g., RED vs. GREEN). They also slightly differ in the size property (e.g., 25 vs. 26). However, the target UI control element 1420A and the candidate UI control element 1460A share the same ARIA label and ARIA role properties.

As noted above with reference to FIG. 12, when one or more matching pairs (or even a single matching pair) of ARIA properties between the candidate UI control element 1460A and the target UI control element 1420A can result in a determination that the candidate UI control element 1460A is the equivalent UI control element corresponding to the target UI control element 1420A. This is because the ARIA properties have been observed to be more stable than DOM properties. Although the DOM properties associated with UI control elements may vary frequently during webpage upgrade, the ARIA properties associated with the UI control elements can remain stable over non-functional upgrades of the webpage. Thus, in one embodiment, a single matching pair of ARIA-Label property between the candidate and target UI control elements can result in a finding of the equivalent UI control element. In another embodiments, the equivalent UI control element is found when both ARIA-Label and ARIA-Role properties have matching pairs. Responsive to determining that one or more of the ARIA properties (e.g., ARIA-Label and ARIA-Role) match, a match can be determined between the elements.

Figure 15A:
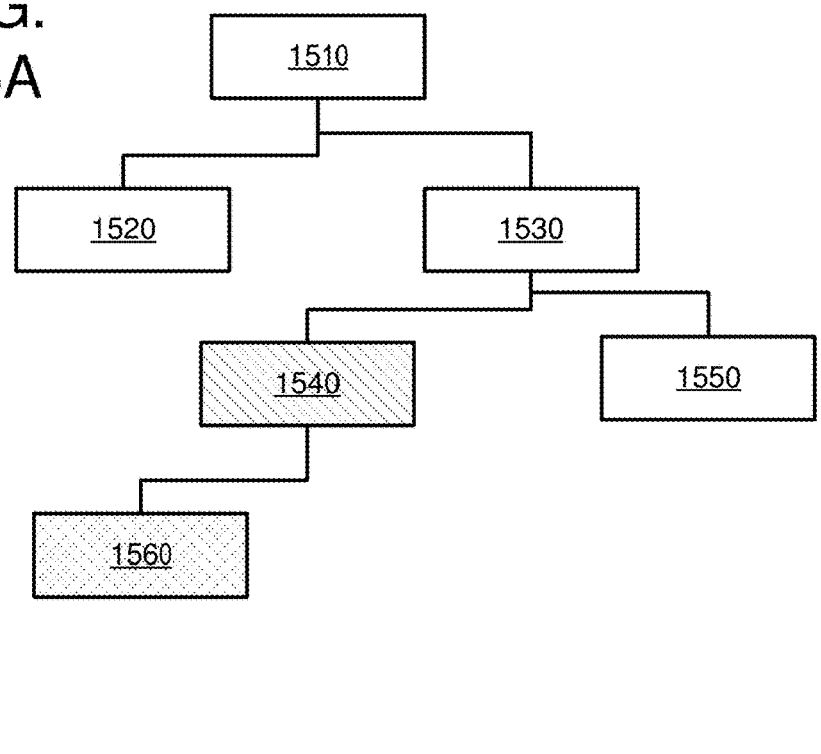
FIG. 15A is an example tree structure of a current document object model (DOM).
Figure 15B:
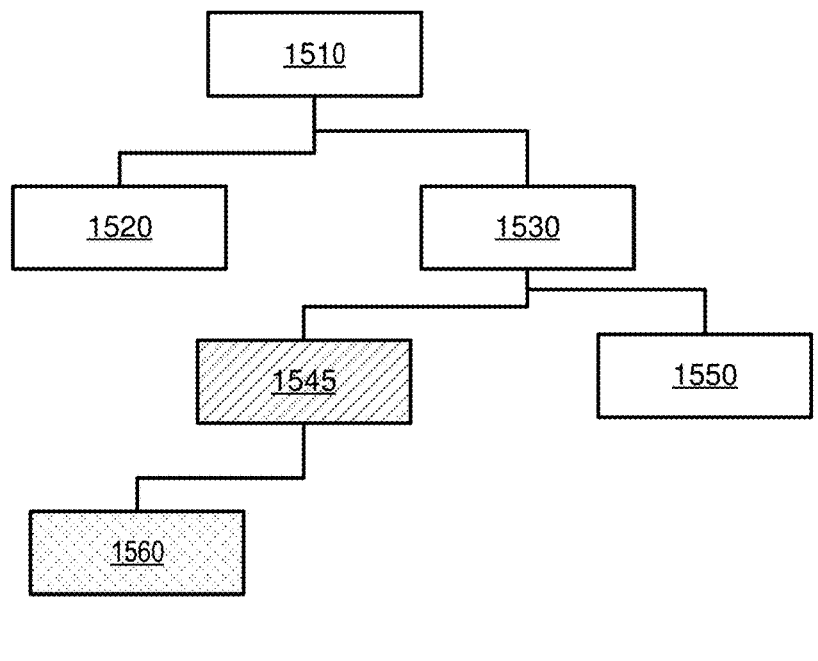
FIG. 15B is an example tree structure of an archived DOM.

Example 13—Example Method of Finding Equivalent UI Control Element Based on DOM Tree Localization FIGS. 15A-B show two tree structures respectively representing a current DOM 1500 (incorporated in the current master data frame) and an archived DOM 1570 (incorporated in an archived master data frame) for a webpage. In this example, the current DOM 1500 and the archived DOM 1570 have similar topographically structure. Further, they share the same nodes 1510, 1520, 1530, 1550 and 1560, but the node 1540 in the current DOM is different from the node 1545 in the archived DOM.

One alternative method of finding an equivalent UI control element is based on DOM tree localization by comparing the current DOM 1500 with the archived DOM 1570 to identify where the two DOMs diverge. Specifically, the method can include traversing both the current DOM 1500 and the archived DOM 1570 following the same traversal sequence (e.g., inorder, preorder, or postorder) and comparing their respective nodes at each level. The traverse and comparison can continue until it is determined that a node in the current DOM 1500 is different from the corresponding node in the archived DOM 1570.

For example, by traversing both DOMs, the method can find matching nodes in the root node 1510 and the first-level child nodes 1520 and 1530. The method can also find that the right child node of 1530, i.e., 1550 is identical for both DOMs, but there is a divergence in the left child node of 1530, which is 1540 in current DOM vs. 1545 in the archived DOM. The method can then compare the child nodes of the divergent nodes 1540 and 1545. In this example, the child node of 1540 is 1560, which is identical to the child node of 1545. Thus, it can be determined that the UI control element represented by node 1540 in the current DOM is equivalent to the UI control element represented by node 1545 in the archived DOM. Thus, if the node 1545 represents the target UI control element, then the method can designate the node 1540 represents the equivalent UI control element corresponding to the target UI control element.

When searching the current DOM for a matching element, searching can be limited to those areas of the DOM identified as divergent. In this way, searching can be more efficient and avoid searching areas in which no match will be found.

Figure 16:
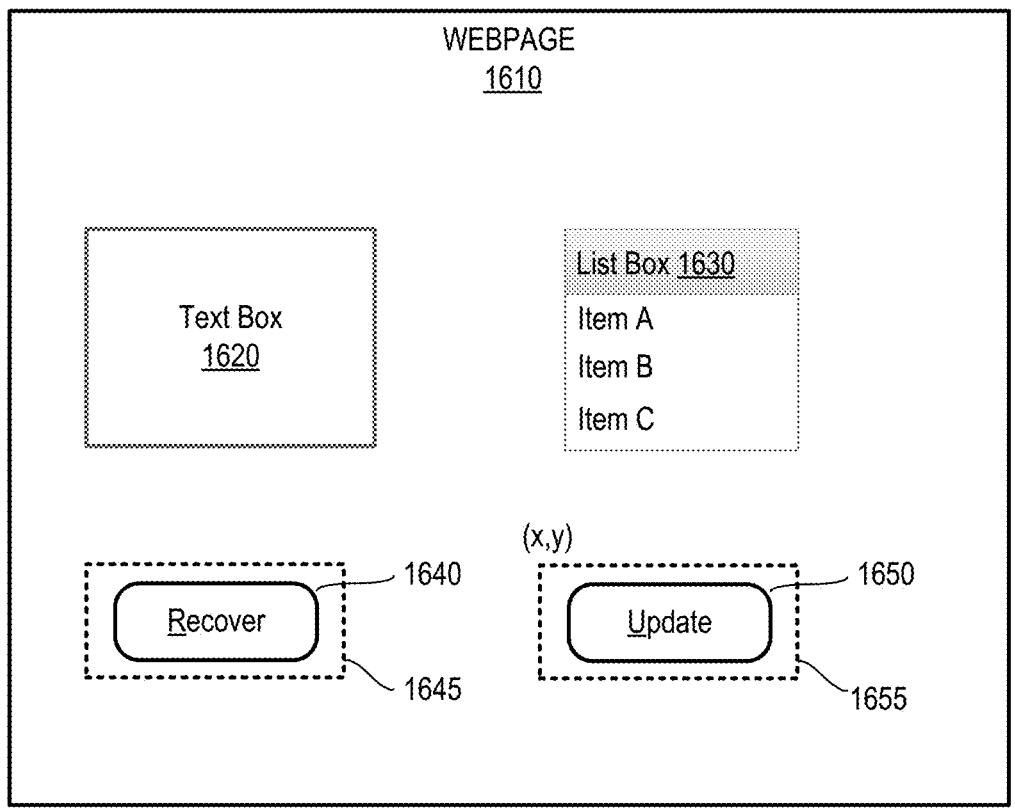
FIG. 16 is an example layout of a webpage having a plurality of UI control elements.
Figure 16:
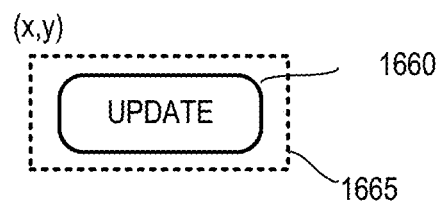

Example 14—Example Method of Finding Equivalent UI Control Element Based on Visual Positioning FIG. 16 shows a schematic diagram 1600 illustrating another method of finding equivalent UI control element based on visual positioning.

In this example, the current webpage 1610 includes a plurality of UI control elements such as a textbox 1620, a list box 1630, a "Recover" button 1640, and an "Update" button 1650. The target UI control element that needs to be identified by the RPA engine is the "UPDATE" button 1660, which is a previous version of the "Update" button 1650. As illustrated in FIG. 16, the "Update" button 1650 in the current webpage 1610 is rendered differently from the target UI control element which has a different label "UPDATE" 1660.

In one embodiment, an archived version of the target UI control element 1660 can be associated with a target image 1665 and a specified location (e.g., a pair of (x, y) coordinates) on the webpage. To find the equivalent UI control element corresponding to the "UPDATE" button 1660, the method can compare a snapshot image 1655 at the specified location (e.g., the (x, y) coordinates) of the current webpage 1610 with the target image 1665. When the snapshot image 1655 matches the target image 1665, the UI control element 1650 associated with the snapshot image 1655 can be designated as the equivalent UI control element corresponding to the target UI control element 1660.

In another embodiment, the archived version of the target UI control element 1660 can be associated with a target image 1665 without a specified location on the webpage. To find the equivalent UI control element corresponding to the "UPDATE" button 1660, the method can scan the current webpage 1610 (e.g., from the top-left corner to the bottom-right corner of the webpage) to find a snapshot image that matches the target image 1665. As illustrated in this example, the method can compare a snapshot image 1645 around the "Recover" button 1640 with the target image 1665 and determine that they are not matching, thus rejecting the "Recover" button 1640 as an equivalent UI control element. On the other hand, the method can compare a snapshot image 1655 around the "Update" button 1650 and determine that they are matching, thus designating the "Update" button 1650 as the equivalent UI control element.

As described herein, the matching between the snapshot image and the target image can be evaluated by a number of techniques. In one embodiment, an optical character recognition (OCR) technique can be used to obtain text that appeared in the snapshot image and the target image. The snapshot image can be deemed to match the target image if the text that appeared in the snapshot image matches that of the target image. In some embodiments, at least some of the attributes or formats of the text, such as font type, font color, font size, underline, boldness, capitalization, etc., can be ignored in the comparison such that the text "Update" on button 1650 can be determined to be equivalent to the text "UPDATE" on button 1660. In alternative embodiments, the matching between the images can be assessed based on any known or to be developed image pattern recognition algorithm.

If a number of features match (e.g., a threshold number, percentage, or the like, including weights, if any), a match is indicated, and the matching element can be returned as disclosed herein.

Figure 17:
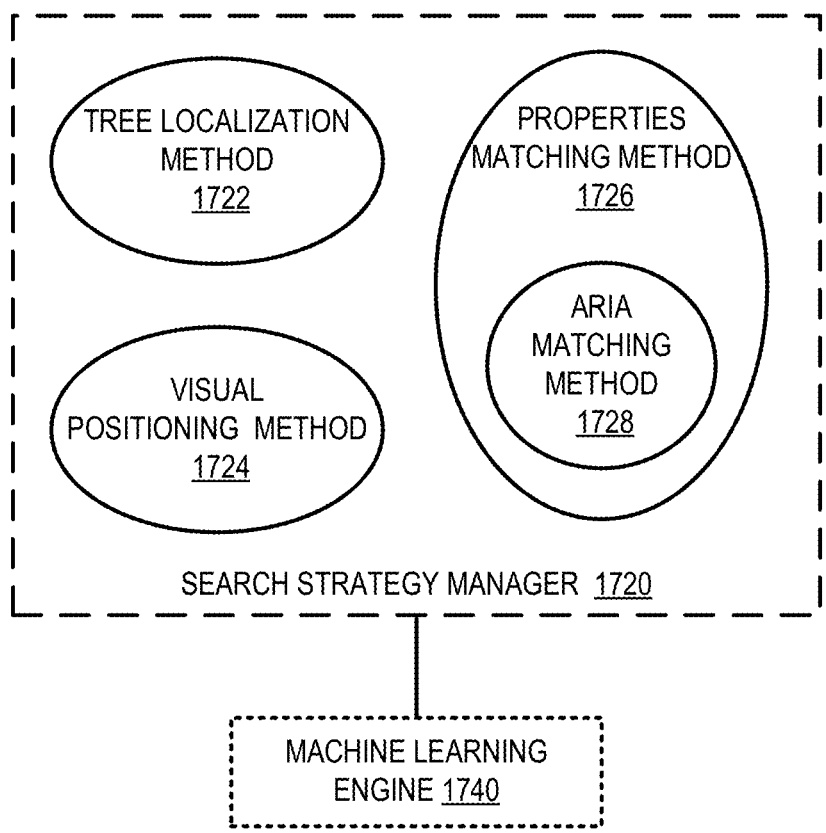
FIG. 17 is a diagram illustrating one example model of an adaptive web-based RPA system using multiple search methods in conjunction with a machine learning engine.

Example 15—Example Adaptive Control Finder for Adaptive Selection of Search Method Based on Machine Learning FIG. 17 shows a schematic diagram illustrating the adaptive control finder 1700 configured to adaptively select a search method to find a target UI control element and can be used in any of the examples herein. Specifically, the adaptive control finder 1700 can maintain a search strategy manager 1720 interacting with a machine learning engine 1740. To find the target UI control element, the search strategy manager 1720 can select from any one of a plurality of search methods including the tree localization method 1722 described in Example 13, the visual positioning method 1724 described in Example 14, and the properties matching method 1726 described in Example 11. The properties matching method 1726 can further include the ARIA matching 1728 method described in Example 12. Each of the search methods can be associated with a preference score. Upon receiving a request from the RPA engine to identify a target UI control element in a webpage, the search strategy manager 1720 can select one of the search methods that has the highest preference score to find the equivalent UI control element. Based on the search results, the machine learning engine 1740 can update the preference score of the selected search method.

Figure 18:
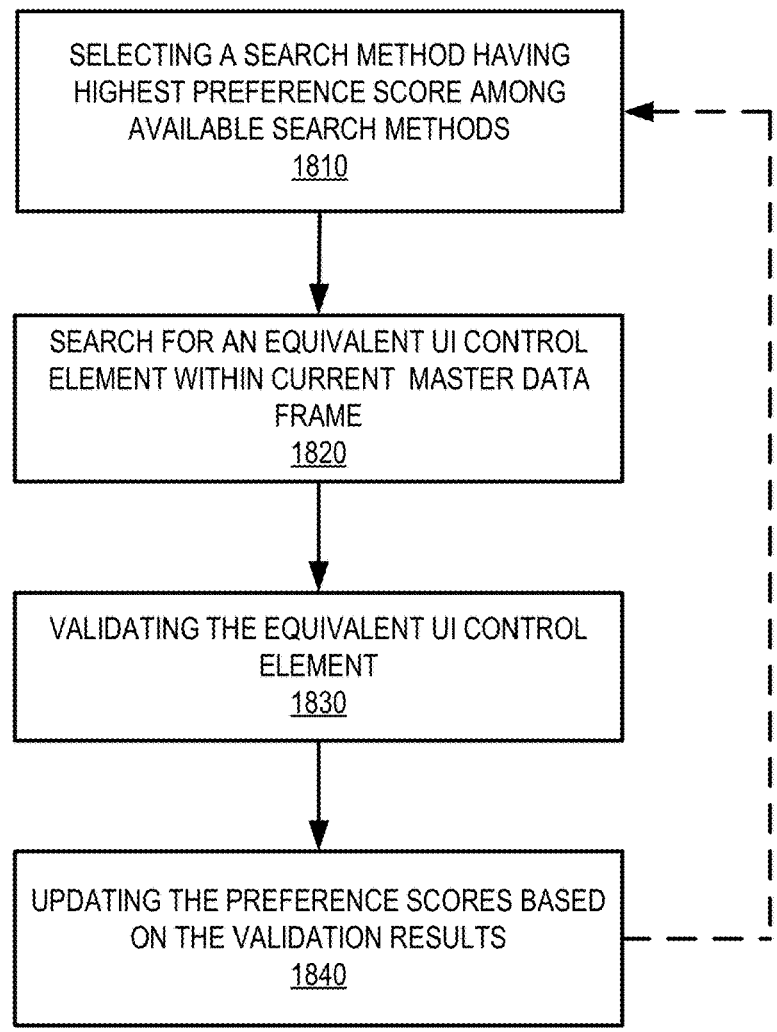
FIG. 18 is an example flowchart illustrating an example method of optimize the search method based on machine learning.

FIG. 18 is a flowchart 1800 of an example method of adaptive selection of a search method based on machine learning. Features for machine learning can include the project type, migration type, update type, web page title, and the like.

At 1810, the method selects one search method that has the highest preference score among available search methods. Such a method can be selected based on the project type, migration type, update type, web page title, or the like.

At 1820, the method can use the selected method to search for an equivalent UI control element within the current master data frame.

At 1830, an operator or another software application can validate the correctness of the equivalent UI control element found by the selected method. The validation can either confirm or reject that the equivalent UI control element found by the selected method is actually functionally equivalent to the target UI control element.

At 1840, the method can update the preference score of the selected method based on the validation results.

For example, if the equivalent UI control element found by the selected method is validated, the preference score corresponding to the selected search method can be increased. On the other hand, if the equivalent UI control element found by the selected method is invalided, the preference score corresponding to the selected search method can be decreased. In such circumstances, the method can optionally return to 1810 and select another search method that has the next highest preference score to find the equivalent UI control element corresponding to the target UI control element.

Example 16—Example Embodiment

In an example embodiment, one or more computer-readable media have encoded thereon computer-executable instructions causing one or more processors to perform a method comprising, while displaying a user interface comprising a plurality of user interface control elements represented by a current document object model (DOM), receiving a request from a robotic process automation (RPA) engine to identify a target user interface control element in a webpage represented by a current master data frame, wherein the current master data frame comprises a current document object model (DOM); determining that a target user interface control element identifier associated with the target user interface control element is absent in the current DOM; retrieving an archived version of the target user interface control element from an archived master data frame of the webpage; finding an equivalent user interface control element within the current master data frame based at least on the archived version of the target user interface control element; and outputting the equivalent user interface control element (e.g., an identifier associated with the equivalent user interface control element); wherein the archived version of the target UI control element comprises a plurality of first attributes, and a candidate user interface control element in the current master data frame comprises a plurality of second attributes; wherein finding the equivalent user interface control element comprises identifying matching pairs between the plurality of first attributes of the archived version of the target user interface control element and the plurality of second attributes of the candidate user interface control element; wherein the plurality of first attributes comprise one or more first Accessible Rich Internet Application (ARIA) markers and the plurality of second attributes comprise one or more second ARIA markers, and wherein the one or more first ARIA markers and the one or more second ARIA markers are generated from an in-browser service; wherein finding the equivalent user interface control element comprises identifying at least one of the first ARIA markers matches at least one of the second ARIA markers.

The one or more first ARIA markers can comprise at least a first ARIA label or a first ARIA role associated with the archived version of the target user interface control element, and the one or more second ARIA markers comprises at least a second ARIA label or a second ARIA role associated with the candidate user interface control element. For example, the one or more first ARIA markers can comprise an ARIA label marker and an ARIA role marker.

Example 17—Example Advantages

A number of advantages can be achieved via the technology described herein. For example, the adaptive web-based RPA system disclosed herein can handle automated maintenance for non-functional update to a webpage. The system can reliably and efficiently find equivalent UI control elements that are functional equivalent to the target UI control elements whose properties have been modified after upgrade of the webpages. Even for legacy applications that render webpages without providing APIs for third-party software to access and interact with the rendered webpages, the adaptive web-based RPA system described herein can still automate interactions with the UI control elements of those webpages. Further, the adaptive web-based RPA system described herein can offer flexibility to software developers to explore and implement non-functional changes of web application without breaking the RPA scripts. For example, a smooth migration to a new UI framework can be facilitated without impacting RPA script functionality, removing an obstacle to taking advantage of the new UI framework.

Therefore, the described technologies can be useful to allow an RPA system to automatically adapt to changes in the underlying user interface, even for non-functional changes that are transparent to the end user but that break RPA scripts.

Example 18—Example Computing Systems

Figure 19:
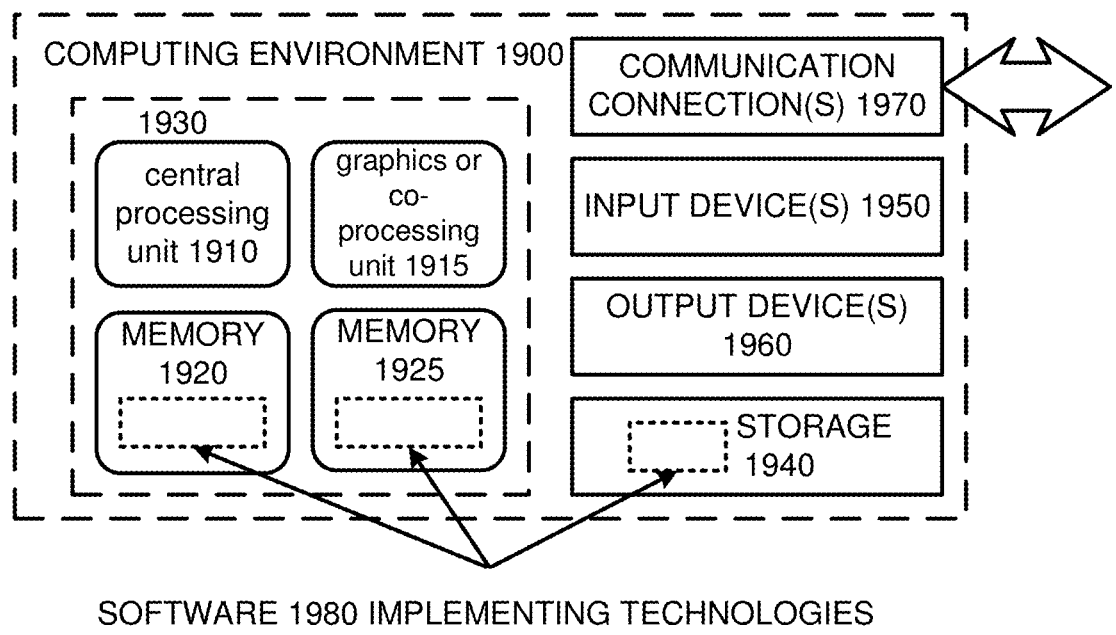
FIG. 19 is a block diagram of an example computing system in which described embodiments can be implemented.

FIG. 19 depicts an example of a suitable computing system 1900 in which the described innovations can be implemented. The computing system 1900 is not intended to suggest any limitation as to scope of use or functionality of the present disclosure, as the innovations can be implemented in diverse computing systems.

With reference to FIG. 19, the computing system 1900 includes one or more processing units 1910, 1915 and memory 1920, 1925. In FIG. 19, this basic configuration 1930 is included within a dashed line. The processing units 1910, 1915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 can be volatile memory (e.g., registers, cache, RAM), non-volatile memory (e.g., ROM, EEPROM, flash memory, etc.), or some combination of the two, accessible by the processing unit(s) 1910, 1915. The memory 1920, 1925 stores software 1980 implementing one or more innovations described herein, in the form of computer-executable instructions suitable for execution by the processing unit(s) 1910, 1915.

A computing system 1900 can have additional features. For example, the computing system 1900 includes storage 1940, one or more input devices 1950, one or more output devices 1960, and one or more communication connections 1970, including input devices, output devices, and communication connections for interacting with a user. An interconnection mechanism (not shown) such as a bus, controller, or network interconnects the components of the computing system 1900. Typically, operating system software (not shown) provides an operating environment for other software executing in the computing system 1900, and coordinates activities of the components of the computing system 1900.

The tangible storage 1940 can be removable or non-removable, and includes magnetic disks, magnetic tapes or cassettes, CD-ROMs, DVDs, or any other medium which can be used to store information in a non-transitory way and which can be accessed within the computing system 1900. The storage 1940 stores instructions for the software 1980 implementing one or more innovations described herein.

The input device(s) 1950 can be an input device such as a keyboard, mouse, pen, or trackball, a voice input device, a scanning device, touch device (e.g., touchpad, display, or the like) or another device that provides input to the computing system 1900. The output device(s) 1960 can be a display, printer, speaker, CD-writer, or another device that provides output from the computing system 1900.

The communication connection(s) 1970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 19—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 20—Example Cloud Computing Environment

Figure 20:
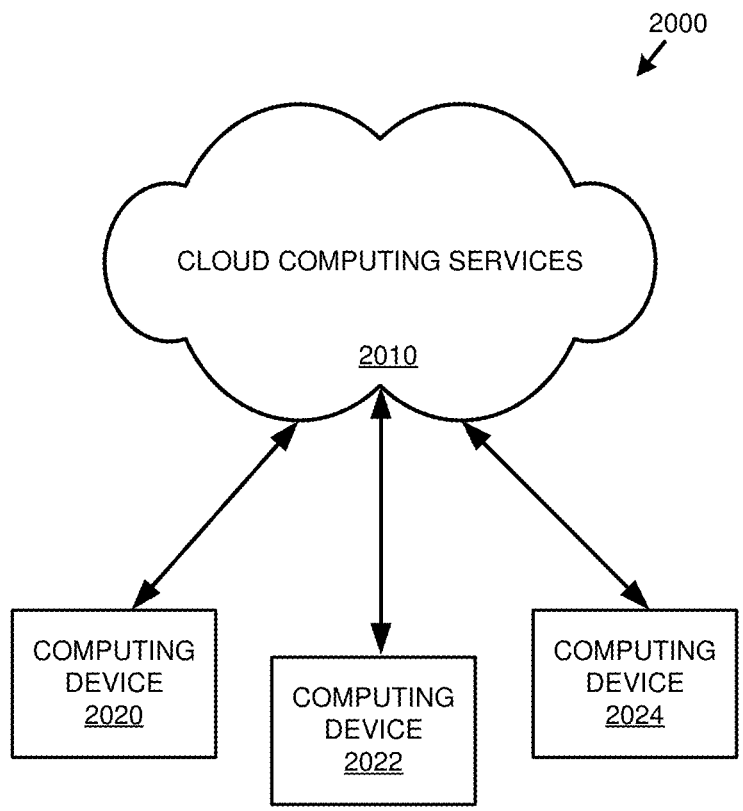
FIG. 20 is a block diagram of an example cloud computing environment that can be used in conjunction with the technologies described herein.

FIG. 20 depicts an example cloud computing environment 2000 in which the described technologies can be implemented, including, e.g., the system 100 of FIG. 1 and other systems herein. The cloud computing environment 2000 comprises cloud computing services 2010. The cloud computing services 2010 can comprise various types of cloud computing resources, such as computer servers, data storage repositories, networking resources, etc. The cloud computing services 2010 can be centrally located (e.g., provided by a data center of a business or organization) or distributed (e.g., provided by various computing resources located at different locations, such as different data centers and/or located in different cities or countries).

The cloud computing services 2010 are utilized by various types of computing devices (e.g., client computing devices), such as computing devices 2020, 2022, and 2024. For example, the computing devices (e.g., 2020, 2022, and 2024) can be computers (e.g., desktop or laptop computers), mobile devices (e.g., tablet computers or smart phones), or other types of computing devices. For example, the computing devices (e.g., 2020, 2022, and 2024) can utilize the cloud computing services 2010 to perform computing operations (e.g., data processing, data storage, and the like).

In practice, cloud-based, on-premises-based, or hybrid scenarios can be supported.

Example 21—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 22—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
    during robotic process automation (RPA) processing, receiving a request to identify a target user interface control element in a webpage represented by a current master data frame, wherein the current master data frame comprises a current document object model (DOM);
    determining that a target user interface control element identifier associated with the target user interface control element is absent in the current DOM;
    retrieving an archived version of the target user interface control element from an archived master data frame of the webpage;
    finding an equivalent user interface control element within the current master data frame based at least on the archived version of the target user interface control element; and
    outputting the equivalent user interface control element.

2. The method of claim 1, wherein:
    the archived version of the target user interface control element comprises a plurality of first attributes;
    a candidate user interface control element in the current master data frame comprises a plurality of second attributes; and
    wherein finding the equivalent user interface control element comprises identifying matching pairs between the plurality of first attributes of the archived version of the target user interface control element and the plurality of second attributes of the candidate user interface control element.

3. The method of claim 2, wherein the candidate user interface control element in the current master data frame is identified as the equivalent user interface control element when a count of matching pairs between the plurality of first attributes and the plurality of second attributes exceeds a predefined limit.

4. The method of claim 2, wherein the matching pairs are associated with corresponding weighting factors, and wherein the candidate user interface control element in the current master data frame is identified as the equivalent user interface control element when a sum of the weighting factors corresponding to the matching pairs exceeds a predefined limit.

5. The method of claim 4, wherein at least one weighting factor corresponding to a matching pair is incremented when the candidate user interface control element in the current master data frame is identified as the equivalent user interface control element.

6. The method of claim 2, wherein the plurality of first attributes comprise one or more first Accessible Rich Internet Application (ARIA) markers and the plurality of second attributes comprise one or more second ARIA markers.

7. The method of claim 6, wherein finding the equivalent user interface control element comprises identifying at least one of the first ARIA markers matches at least one of the second ARIA markers.

8. The method of claim 6, wherein the one or more first ARIA markers comprises at least an ARIA label and an ARIA role associated with the archived version of the target user interface control element.

9. The method of claim 1, wherein:
    finding the equivalent user interface control element is performed using a first search method selected from a plurality of search methods based on evaluation of preference scores associated with the plurality of search methods, wherein the first search method has a highest preference score among the plurality of search methods; and
    the method further comprises:
    receiving validation results confirming whether the equivalent user interface control element corresponding to the equivalent user interface control identifier is actually functionally equivalent to the target user interface control element; and
    based on the validation results, updating the preference score of the first search method.

10. The method of claim 1, wherein finding the equivalent user interface control element comprises:
    traversing the current DOM;
    traversing an archived DOM contained in the archived master data frame;
    comparing a first node in the current DOM with a second node in the archived DOM, wherein a traversal path of the first node in the current DOM is topographically identical to a traversal path of the second node in the archived DOM;
    determining that the first node in the current DOM is different from the second node in the archived DOM;
    comparing one or more child nodes of the first node in the current DOM with one or more child nodes of the second node in the archived DOM;
    determining that the first node corresponds to the target user interface control element and the one or more child nodes of the first node in the current DOM match the one or more child nodes of the second node in the archived DOM; and
    determining that the second node corresponds to the equivalent user interface control element.

11. The method of claim 1, wherein the archived version of the target user interface control element is associated with a target image and a specified location on the webpage, and wherein finding the equivalent user interface control element comprises:
    comparing a snapshot image at the specified location on the webpage with the target image; and
    when the snapshot image matches the target image and a first user interface control element is associated with the snapshot image, determining that the first user interface control element is the equivalent user interface control element.

12. The method of claim 11, wherein the target image is associated with predefined characters, and finding the equivalent user interface control element further comprises scanning the webpage, wherein the scanning comprises:
    identifying a plurality of images at a plurality of locations on the webpage;
    recognizing characters contained in the plurality of images; and
    when one of the plurality of images contains characters that match the predefined characters associated with the target image and a second user interface control element is associated with one of the plurality of images, determining that the second user interface control element is the equivalent user interface control element.

13. A system comprising:
one or more processors; and
memory coupled to the one or more processors comprising instructions causing the one or more processors to perform the following when executed:
receiving a request from a robotic process automation (RPA) engine to identify a target user interface control element in a webpage represented by a current master data frame, wherein the current master data frame comprises a current document object model (DOM);
determining that a target user interface control element identifier associated with the target user interface control element is absent in the current DOM;
retrieving an archived version of the target user interface control element from an archived master data frame of the webpage;
finding an equivalent user interface control element within the current master data frame based at least on the archived version of the target user interface control element; and
outputting the equivalent user interface control element.

14. The system of claim 13, wherein:
the archived version of the target user interface control element comprises a plurality of first attributes;
a candidate user interface control element in the current master data frame comprises a plurality of second attributes; and
wherein finding the equivalent user interface control element comprises identifying matching pairs between the plurality of first attributes of the archived version of the target user interface control element and the plurality of second attributes of the candidate user interface control element.

15. The system of claim 14, wherein the candidate user interface control element in the current master data frame is identified as the equivalent user interface control element when a count of matching pairs between the plurality of first attributes and the plurality of second attributes exceeds a predefined limit.

16. The system of claim 14, wherein the matching pairs are associated with corresponding weighting factors, and wherein the candidate user interface control element in the current master data frame is identified as the equivalent user interface control element when a sum of the weighting factors corresponding to the matching pairs exceeds a predefined limit.

17. The system of claim 14, wherein the plurality of first attributes comprise one or more first Accessible Rich Internet Application (ARIA) markers and the plurality of second attributes comprise one or more second ARIA markers, and wherein the one or more first ARIA markers and the one or more second ARIA markers are generated from an in-browser service.

18. The system of claim 17, wherein finding the equivalent user interface control element comprises identifying at least one of the first ARIA markers matches at least one of the second ARIA markers.

19. The system of claim 13, wherein finding the equivalent user interface control element comprises:
traversing the current DOM;
traversing an archived DOM contained in the archived master data frame;
comparing a first node in the current DOM with a second node in the archived DOM, wherein a traversal path of the first node in the current DOM is topographically identical to a traversal path of the second node in the archived DOM;
determining that the first node in the current DOM is different from the second node in the archived DOM;
comparing one or more child nodes of the first node in the current DOM with one or more child nodes of the second node in the archived DOM;
determining that the first node corresponds to the target user interface control element and the one or more child nodes of the first node in the current DOM match the one or more child nodes of the second node in the archived DOM; and
determining that the second node corresponds to the equivalent user interface control element.
comparing one or more child nodes of the first node in the current DOM with one or more child nodes of the second node in the archived DOM; and
determining that the first node corresponds to the target user interface control element and the one or more child nodes of the first node in the current DOM match the one or more child nodes of the second node in the archived DOM; and
determining that the second node corresponds to the equivalent user interface control element.

20. One or more computer-readable media having encoded thereon computer-executable instructions that when executed cause one or more processors to perform a method comprising:
while displaying a user interface comprising a plurality of user interface control elements represented by a current document object model (DOM), receiving a request from a robotic process automation (RPA) engine to identify a target user interface control element in a webpage represented by a current master data frame, wherein the current master data frame comprises a current document object model (DOM);
determining that a target user interface control element identifier associated with the target user interface control element is absent in the current DOM;
retrieving an archived version of the target user interface control element from an archived master data frame of the webpage;
finding an equivalent user interface control element within the current master data frame based at least on the archived version of the target user interface control element; and
outputting the equivalent user interface control element;
wherein the archived version of the target user interface control element comprises a plurality of first attributes, and a candidate user interface control element in the current master data frame comprises a plurality of second attributes;
wherein finding the equivalent user interface control element comprises identifying matching pairs between the plurality of first attributes of the archived version of the target user interface control element and the plurality of second attributes of the candidate user interface control element;
wherein the plurality of first attributes comprise one or more first Accessible Rich Internet Application (ARIA) markers and the plurality of second attributes comprise one or more second ARIA markers, and wherein the one or more first ARIA markers and the one or more second ARIA markers are generated from an in-browser service; and
wherein finding the equivalent user interface control element comprises identifying at least one of the first ARIA markers matches at least one of the second ARIA markers.

* * * * *